US010598543B1

(12) United States Patent
Mansour et al.

(10) Patent No.: US 10,598,543 B1
(45) Date of Patent: Mar. 24, 2020

(54) MULTI MICROPHONE WALL DETECTION AND LOCATION ESTIMATION

(71) Applicant: Amazon Technologies, Inc., Seattle, WA (US)

(72) Inventors: Mohamed Mansour, Cupertino, CA (US); Srivatsan Kandadai, San Jose, CA (US); Stefan Vlaski, Karben (DE)

(73) Assignee: Amazon Technologies, Inc., Seattle, WA (US)

( * ) Notice: Subject to any disclaimer, the term of this patent is extended or adjusted under 35 U.S.C. 154(b) by 289 days.

(21) Appl. No.: 15/830,622

(22) Filed: Dec. 4, 2017

(51) Int. Cl.
*G01H 7/00* (2006.01)
*H04R 1/32* (2006.01)
*H04R 3/00* (2006.01)
*G01S 15/10* (2006.01)
*G01S 7/527* (2006.01)
*G10L 21/0232* (2013.01)
*G10L 21/0208* (2013.01)

(52) U.S. Cl.
CPC ............ *G01H 7/00* (2013.01); *G01S 7/5273* (2013.01); *G01S 15/101* (2013.01); *H04R 1/326* (2013.01); *H04R 3/005* (2013.01); *G10L 21/0232* (2013.01); *G10L 2021/02082* (2013.01); *H04R 2201/403* (2013.01)

(58) Field of Classification Search
CPC .......... G01H 7/00; H04R 3/005; H04R 1/326; H04R 2201/403; G01S 7/5273; G01S 15/101; G10L 2021/02082; G10L 21/0232
See application file for complete search history.

(56) References Cited

U.S. PATENT DOCUMENTS

| 10,187,721 | B1 * | 1/2019 | Mansour | H04R 1/406 |
| 10,375,501 | B2 * | 8/2019 | Mertins | H04S 7/00 |
| 2017/0370710 | A1 * | 12/2017 | Chen | G01B 17/00 |
| 2018/0139563 | A1 * | 5/2018 | Mertins | G01H 7/00 |

* cited by examiner

*Primary Examiner* — Daniel Pihulic
(74) *Attorney, Agent, or Firm* — Pierce Atwood LLP

(57) ABSTRACT

A system that performs wall detection, range estimation, corner detection and/or angular estimation. The system may determine an aggregate impulse response (e.g., impulse response of all components in a room) and may perform a deconvolution to remove a system impulse response (e.g., impulse response associated with loudspeaker(s) and microphone(s)). Thus, the system may use a sparse deconvolution algorithm to estimate a room impulse response (e.g., determine acoustic characteristics of the room). The system may detect a peak in the room impulse response and determine a distance and/or direction to an acoustically reflective surface based on the peak.

20 Claims, 13 Drawing Sheets

FIG. 2
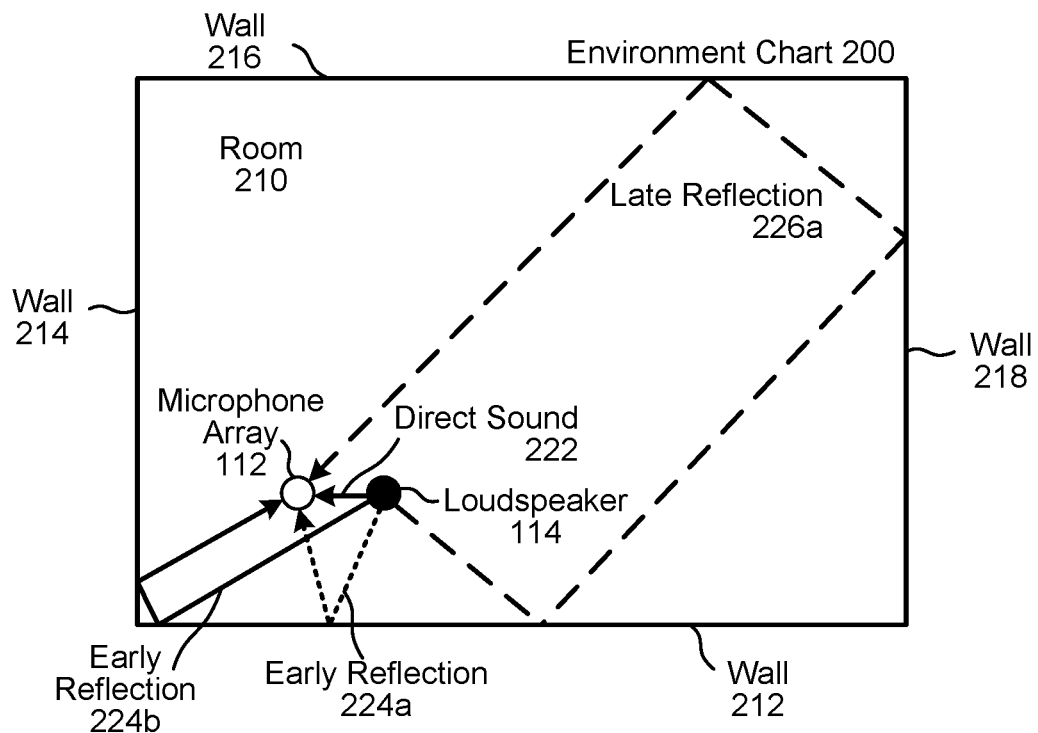
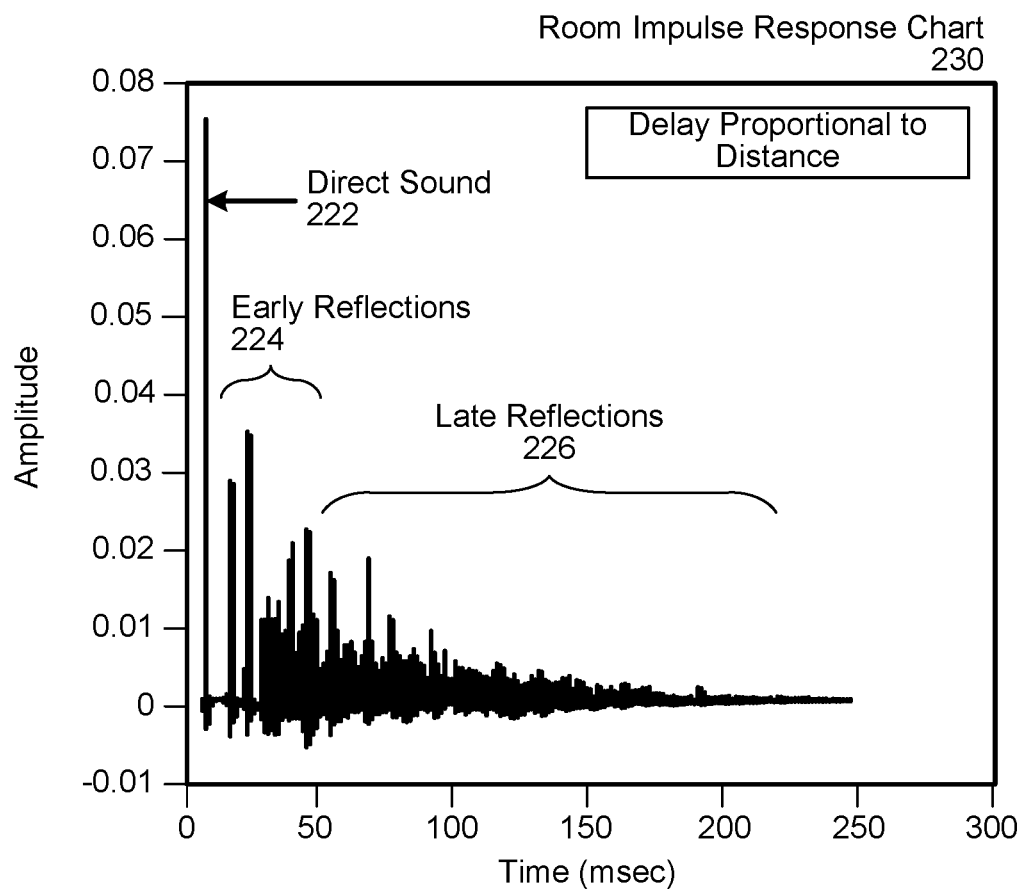

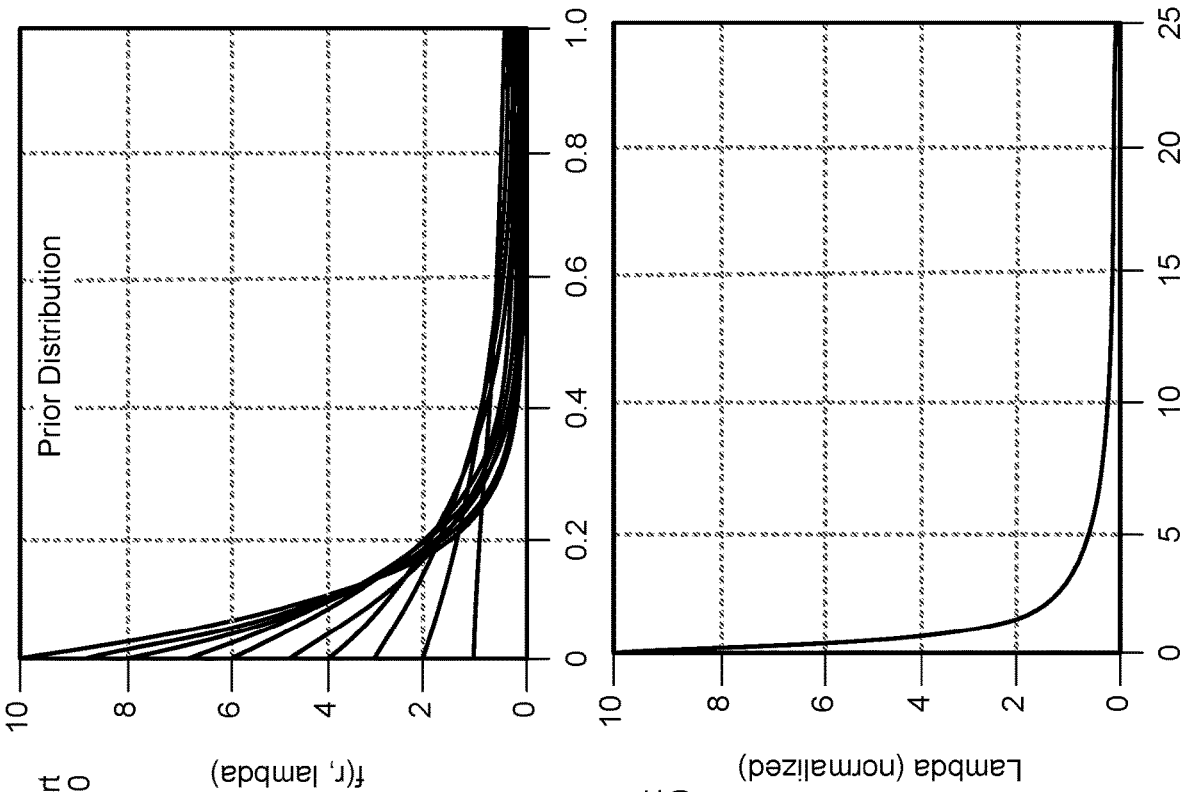

FIG. 4B

Maximum likelihood solution under this prior is:

$$r^o = \arg\min_{r} \underbrace{\|h - Sr\|_2^2}_{\text{Least-squares fit } 432} + \underbrace{\lambda^T r}_{\text{Lasso (Sparsity)} 434}, \quad \underbrace{\text{subject to } r \geq 0}_{\text{Non-negativity } 436}$$

Sparse Deconvolution Algorithm 430

Solution may be pursued by means of a projected proximal gradient descent algorithm.

FIG. 9
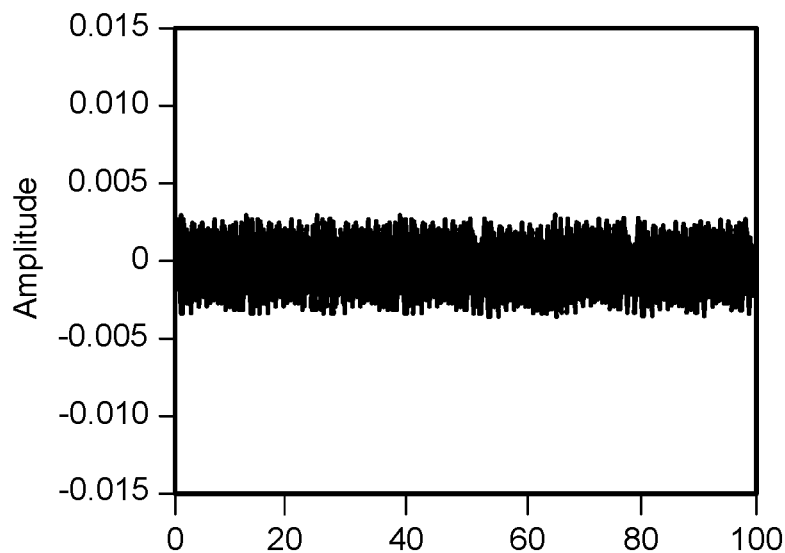
Beamformed Impulse Response Chart 910
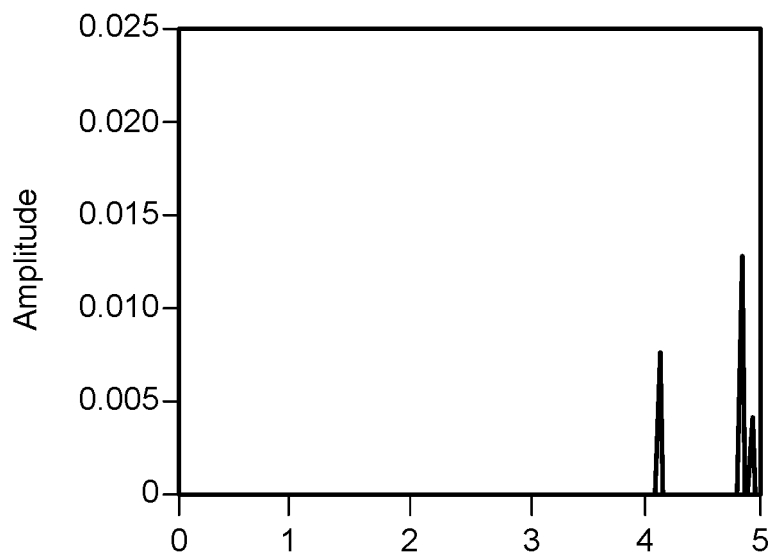
Filtered Impulse Response Chart 920
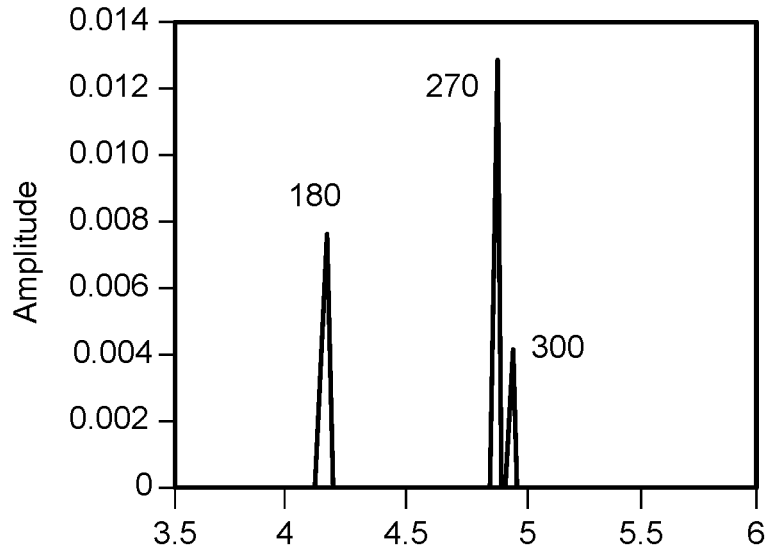
Filtered Impulse Response Chart 922

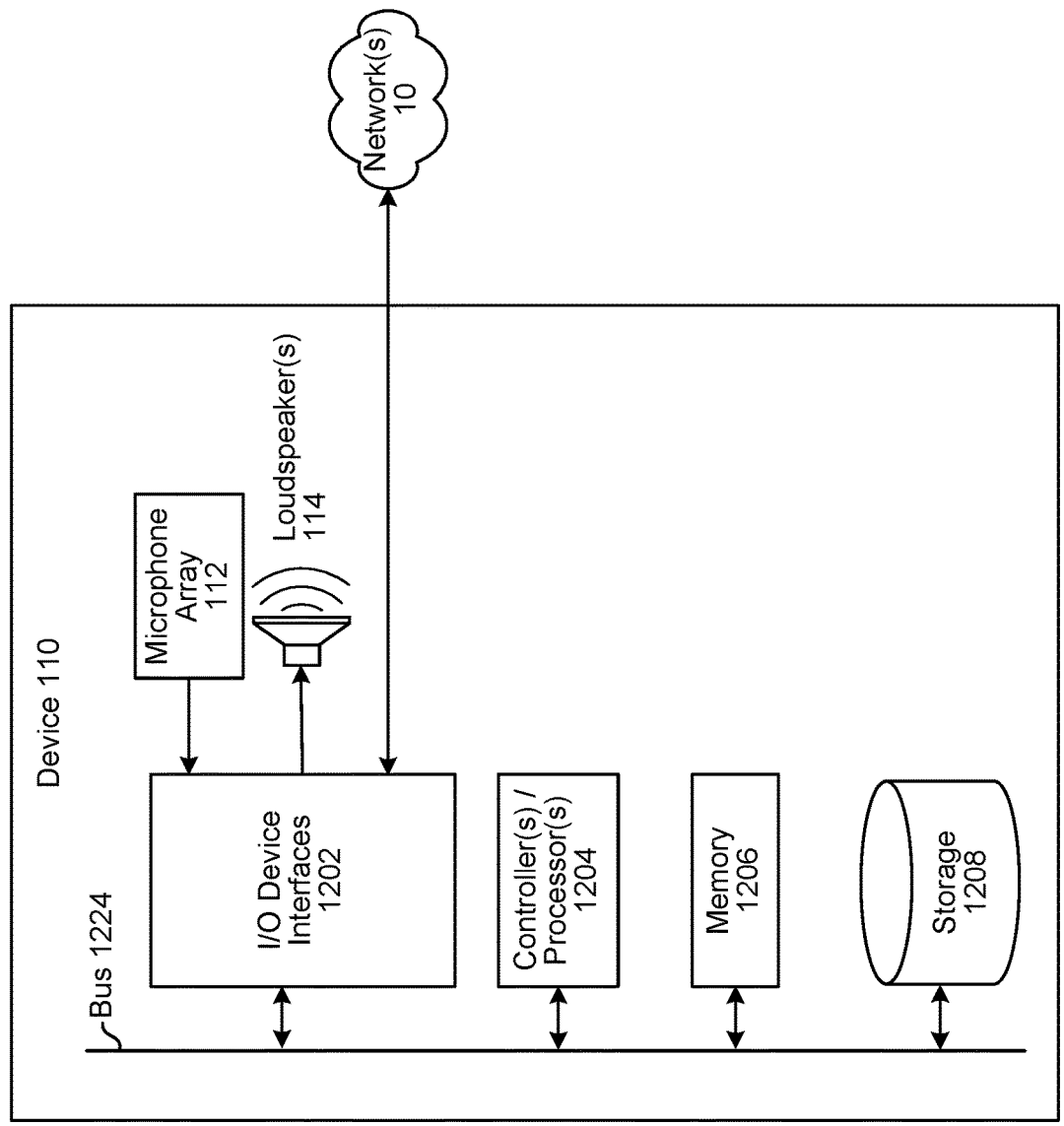

MULTI MICROPHONE WALL DETECTION AND LOCATION ESTIMATION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 2 illustrates examples of sound propagation in a room resulting in direct sound, early reflections and late reflections.

FIGS. 4A-4B illustrate examples of determining a room impulse response based on an aggregate impulse response according to embodiments of the present disclosure.

FIG. 9 illustrates examples of beamformed aggregate impulse responses and beamformed room impulse responses according to embodiments of the present disclosure.

FIG. 12 is a block diagram conceptually illustrating example components of a system for determining a distance and/or direction of an acoustically reflective surface according to embodiments of the present disclosure.

DETAILED DESCRIPTION

Electronic devices may be used to capture audio data and generate audio. For example, an electronic device may generate audio using loudspeakers and may capture audio data using one or more microphones. If the electronic device is located in the vicinity of hard surfaces (e.g., walls, ceiling, shelves, etc.), the presence of acoustically reflective surfaces negatively impacts performance of the electronic device. For example, the presence of acoustically reflective surfaces changes a transfer function of the broader acoustic system and can have a negative effect on both speech recognition performance and sound quality.

To improve performance of speech recognition and sound quality, devices, systems and methods are disclosed that perform wall detection, range estimation, corner detection and/or angular estimation. The system may determine an aggregate impulse response (e.g., impulse response of all components in a room) and may perform a deconvolution to remove a system impulse response (e.g., impulse response associated with loudspeaker(s) and microphone(s)). For example, the system may use a sparse deconvolution algorithm to estimate a room impulse response (e.g., acoustic characteristics of the room). The system may detect a peak in the room impulse response and determine a distance and/or direction to an acoustically reflective surface based on the peak.

Figure 1:
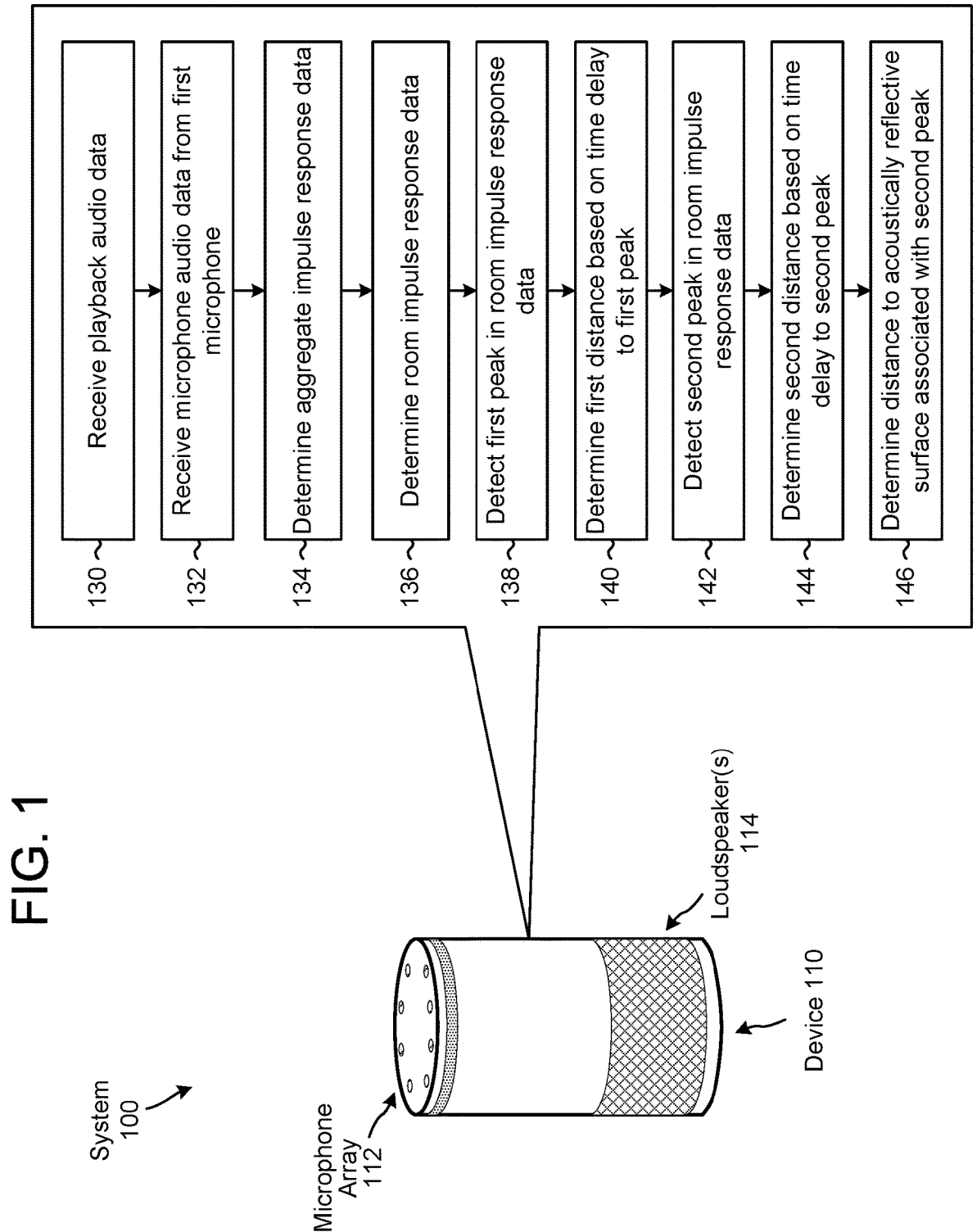
FIG. 1 illustrates a system for determining a distance and/or direction of an acoustically reflective surface according to embodiments of the present disclosure.

FIG. 1 illustrates a system for determining a distance and/or direction of an acoustically reflective surface according to embodiments of the present disclosure. As illustrated in FIG. 1, a system 100 may include a device 110 that has a microphone array 112 and one or more loudspeaker(s) 114. To detect user speech or other audio, the device 110 may use one or more microphones in the microphone array 112 to generate microphone audio data that captures audio in a room (e.g., an environment) in which the device 110 is located. As is known and as used herein, "capturing" an audio signal includes a microphone transducing audio waves (e.g., sound waves) of captured sound to an electrical signal and a codec digitizing the signal to generate the microphone audio data.

The device 110 may also send playback audio data to the loudspeaker(s) 114 and the loudspeaker(s) 114 may generate audible sound(s) based on the playback audio data. When the loudspeaker(s) 114 generate the audible sound(s), the microphone array 112 may capture portions of the audible sound(s) (e.g., an echo), such that the microphone audio data may include a representation of the audible sound(s) generated by the loudspeaker(s) 114 (e.g., corresponding to portions of the playback audio data) in addition to any additional sounds (e.g., local speech from a user) picked up by the microphone array 112. Thus, the microphone audio data may be referred to as input audio data and may include a representation of the audible sound(s) output by the loudspeaker(s) 114 and/or a representation of the speech input. While FIG. 1 illustrates the microphone array 112 including eight microphones, the disclosure is not limited thereto and the microphone array 112 may include any number of microphones without departing from the disclosure.

An audio signal is a representation of sound and an electronic representation of an audio signal may be referred to as audio data, which may be analog and/or digital without departing from the disclosure. For ease of illustration, the disclosure may refer to either audio data (e.g., reference audio data or playback audio data, microphone audio data or input audio data, etc.) or audio signals (e.g., playback signals, microphone signals, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

The portion of the audible sound(s) output by the loudspeaker(s) 114 that reaches the microphone array 112 (e.g., echo portion) can be characterized based on a transfer function. For example, a first portion of the playback audio data output by the loudspeaker(s) 114 and captured by a first microphone in the microphone array 112 can be characterized (e.g., modeled) using a first transfer function $h_{a1}(n)$ and a second portion of the playback audio data output by the loudspeaker(s) 114 and captured by a second microphone in the microphone array 112 can be characterized using a second transfer function $h_{a2}(n)$. Thus, a number of transfer functions may vary depending on the number of loudspeaker(s) 114 and/or microphones in the microphone array 112 without departing from the disclosure. The transfer functions h(n) vary with the relative positions of the components and the acoustics of the room (e.g., environment surrounding the device 110). If the position of all of the objects in the room are static, the transfer functions h(n) are likewise static. Conversely, if the position of an object in the room changes, the transfer functions h(n) may change.

The microphone audio data contains some of the reproduced sounds from the playback audio data (e.g., "echo" signal), in addition to any additional sounds picked up in the room (e.g., local speech from a user). The echo signal portion of the microphone audio data can be expressed as:

$$y_1(n)=h_1(n)*x_1(n)+h_2(n)*x_2(n)+h_p(n)*x_p(n) \quad [1]$$

where $y_1(n)$ is estimated echo audio data corresponding to an estimate of the echo received by a first microphone in the microphone array 112, $[h_1(n), h_2(n), \ldots h_p(n)]$ correspond to loudspeaker-to-microphone impulse responses in the room (e.g., aggregate impulse response, which includes the system impulse response and the room impulse response), $[x_1(n), x_2(n), \ldots x_p(n)]$ correspond to playback audio data (e.g., loudspeaker reference signals) for P loudspeakers, * denotes a mathematical convolution, and "n" is an audio sample.

Before determining the estimated echo audio data, the device 110 may modify the playback audio data to compensate for distortion, variable delay, drift, skew and/or frequency offset. In some examples, the device 110 may include playback reference logic that may receive first playback audio data (e.g., originally transmitted audio output by the loudspeaker(s) 114) and compensate for distortion, variable delay, drift, skew and/or frequency offset to generate second playback audio data. For example, the playback reference logic may determine a propagation delay between the first playback audio data and the microphone audio data and may modify the second playback audio data to remove the propagation delay. Additionally or alternatively, the playback reference logic may determine a frequency offset between the first playback audio data and the microphone audio data and may add/drop samples of the second playback audio data and/or the microphone audio data to compensate for the frequency offset. For example, the playback reference logic may add at least one sample per cycle when the frequency offset is positive and may remove at least one sample per cycle when the frequency offset is negative. Therefore, the second playback audio data may be aligned with the microphone audio data.

If the device 110 includes a single loudspeaker 114, an acoustic echo canceller (AEC) may perform acoustic echo cancellation for one or more microphones in the microphone array 112. For ease of explanation, the disclosure may refer to removing estimated echo audio data from microphone audio data to perform acoustic echo cancellation. The system 100 removes the estimated echo audio data by subtracting the estimated echo audio data from the microphone audio data, thus cancelling the estimated echo audio data. This cancellation may be referred to as "removing," "subtracting" or "cancelling" interchangeably without departing from the disclosure.

To illustrate an example, the AEC may calculate an estimated transfer function $\hat{h}(n)$ that models an acoustic echo (e.g., impulse response) between the loudspeaker 114 and an individual microphone in the microphone array 112. Thus, the AEC (or multiple AECs) may include a first echo estimation filter block that uses a first estimated transfer function $\hat{h}_1(n)$ that models a first transfer function $h_{a1}(n)$ between the loudspeaker 114 and a first microphone 112a of the microphone array, a second echo estimation filter block that uses a second estimated transfer function $\hat{h}_2(n)$ that models a second transfer function $h_{a2}(n)$ between the loudspeaker 114 and a second microphone 112b, and so on.

The echo estimation filter blocks use the estimated transfer functions (e.g., $\hat{h}_1(n)$ and $\hat{h}_2(n)$) to produce estimated echo audio data (e.g., first estimated echo audio data for the first microphone 112a, second estimated echo audio data for a second microphone 112b, etc.). For example, the AEC may convolve the second playback audio data (e.g., playback audio data after compensating for distortion, variable delay, drift, skew and/or frequency offset) with the estimated transfer functions $\hat{h}(n)$ (e.g., estimated impulse responses of the room) to generate the estimated echo audio data. Thus, the AEC may convolve the second playback audio data by the first estimated transfer function $\hat{h}_1(n)$ to generate first estimated echo data, which models a portion of first microphone audio data (e.g., output of the first microphone 112a), may convolve the second playback audio data by the second estimated transfer function $\hat{h}_2(n)$ to generate the second estimated echo audio data, which models a portion of second microphone audio data (e.g., output of the second microphone 112b), and so on. The AEC may determine the estimated echo audio data using adaptive filters. For example, the adaptive filters may be normalized least means squared (NLMS) finite impulse response (FIR) adaptive filters that adaptively filter the playback audio data using filter coefficients.

If the device 110 includes multiple loudspeakers 114, a multi-channel acoustic echo canceller (MC-AEC) may perform acoustic echo cancellation similarly to the technique described above. Thus, the MC-AEC may calculate estimated transfer functions $\hat{h}(n)$, each of which models an acoustic echo (e.g., impulse response) between an individual loudspeaker 114 and an individual microphone in the microphone array 112. For example, a first echo estimation filter block may use a first estimated transfer function $\hat{h}_1(n)$ that models a first transfer function $h_{a1}(n)$ between a first loudspeaker 114a and a first microphone 112a, a second echo estimation filter block may use a second estimated transfer function $\hat{h}_2(n)$ that models a second transfer function $h_{a2}(n)$ between a second loudspeaker 114b and the first microphone 112a, and so on. In addition, the device 110 may determine a set of transfer functions ĥ(n) for each microphone in the microphone array 112 without departing from the disclosure. For ease of explanation, the loudspeaker(s) 114 will be referred to as a single loudspeaker, which simplifies a corresponding description. However, the disclosure is not limited thereto and the device 110 may include two or more loudspeakers 114 without departing from the disclosure.

When the microphone audio data only corresponds to the echo (e.g., audible sounds produced by the loudspeaker(s) 114), audio data (e.g., e) output by the AEC should eventually converge to zero (assuming that the sounds captured by the microphone array 112 correspond to sound entirely based on the playback audio data rather than additional ambient noises, such that the estimated echo audio data cancels out an entirety of the microphone audio data). However, e→0 does not always imply that h−ĥ→0, where the estimated transfer function ĥ cancelling the corresponding actual transfer function h is the goal of the adaptive filter. For example, the estimated transfer functions ĥ(n) may cancel a particular string of samples, but is unable to cancel all signals, e.g., if the string of samples has no energy at one or more frequencies. As a result, effective cancellation may be intermittent or transitory. Having the estimated transfer function ĥ approximate the actual transfer function h is the goal of single-channel echo cancellation, and becomes even more critical in the case of multichannel echo cancellers that require estimation of multiple transfer functions. Thus, correctly estimating a room impulse response improves a performance of acoustic echo cancellation.

In some examples, the device 110 may include a beamformer that may perform audio beamforming on the microphone audio data to determine target audio data (e.g., audio data on which to perform acoustic echo cancellation). The beamformer may include a fixed beamformer (FBF) and/or an adaptive noise canceller (ANC), enabling the beamformer to isolate audio data associated with a particular direction. The FBF may be configured to form a beam in a specific direction so that a target signal is passed and all other signals are attenuated, enabling the beamformer to select a particular direction (e.g., directional portion of the microphone audio data). In contrast, a blocking matrix may be configured to form a null in a specific direction so that the target signal is attenuated and all other signals are passed (e.g., generating non-directional audio data associated with the particular direction). The beamformer may generate fixed beamforms (e.g., outputs of the FBF) or may generate adaptive beamforms (e.g., outputs of the FBF after removing the non-directional audio data output by the blocking matrix) using a Linearly Constrained Minimum Variance (LCMV) beamformer, a Minimum Variance Distortionless Response (MVDR) beamformer or other beamforming techniques. For example, the beamformer may receive audio input, determine six beamforming directions and output six fixed beamform outputs and six adaptive beamform outputs. In some examples, the beamformer may generate six fixed beamform outputs, six LCMV beamform outputs and six MVDR beamform outputs, although the disclosure is not limited thereto. Using the beamformer and techniques discussed below, the device 110 may determine target signals on which to perform acoustic echo cancellation using the AEC. However, the disclosure is not limited thereto and the device 110 may perform AEC without beamforming the microphone audio data without departing from the present disclosure.

As discussed above, the device 110 may include a microphone array 112 having multiple microphones that are laterally spaced from each other so that they can be used by audio beamforming components to produce directional audio signals. The microphones may, in some instances, be dispersed around a perimeter of the device 110 in order to apply beampatterns to audio signals based on sound captured by the microphone(s). For example, the microphones may be positioned at spaced intervals along a perimeter of the device 110, although the present disclosure is not limited thereto. In some examples, the microphone(s) may be spaced on a substantially vertical surface of the device 110 and/or a top surface of the device 110. Each of the microphones is omnidirectional, and beamforming technology may be used to produce directional audio signals based on audio data generated by the microphones. In other embodiments, the microphones may have directional audio reception, which may remove the need for subsequent beamforming.

In various embodiments, the microphone array 112 may include greater or less than the number of microphones illustrated in FIG. 1. Loudspeaker(s) 114 may be located at the bottom of the device 110, and may be configured to emit sound omnidirectionally, in a 360 degree pattern around the device 110. For example, the loudspeaker(s) 114 may comprise a round loudspeaker element directed downwardly in the lower part of the device 110.

Using the plurality of microphones included in the microphone array 112, the device 110 may employ beamforming techniques to isolate desired sounds for purposes of converting those sounds into audio signals for speech processing by the system. Beamforming is the process of applying a set of beamformer coefficients to audio signal data to create beampatterns, or effective directions of gain or attenuation. In some implementations, these volumes may be considered to result from constructive and destructive interference between signals from individual microphones in a microphone array.

The device 110 may include a beamformer that may include one or more audio beamformers or beamforming components that are configured to generate an audio signal that is focused in a particular direction (e.g., direction from which user speech has been detected). More specifically, the beamforming components may be responsive to spatially separated microphone elements of the microphone array to produce directional audio signals that emphasize sounds originating from different directions relative to the device 110, and to select and output one of the audio signals that is most likely to contain user speech.

Audio beamforming, also referred to as audio array processing, uses a microphone array 112 having multiple microphones that are spaced from each other at known distances. Sound originating from a source is received by each of the microphones. However, because each microphone is potentially at a different distance from the sound source, a propagating sound wave arrives at each of the microphones at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones are combined in such a way that signals from a particular direction experience constructive interference, while signals from other directions experience destructive interference. The parameters used in beamforming may be varied to dynamically select different directions, even when using a fixed-configuration microphone array.

A given beampattern may be used to selectively gather signals from a particular spatial location where a signal source is present. The selected beampattern may be configured to provide gain or attenuation for the signal source. For example, the beampattern may be focused on a particular user's head allowing for the recovery of the user's speech while attenuating noise from an operating air conditioner that is across the room and in a different direction than the user relative to a device that captures the audio signals.

Such spatial selectivity by using beamforming allows for the rejection or attenuation of undesired signals outside of the beampattern. The increased selectivity of the beampattern improves signal-to-noise ratio for the audio signal. By improving the signal-to-noise ratio, the accuracy of speaker recognition performed on the audio signal is improved.

The processed data from the beamformer module may then undergo additional filtering or be used directly by other modules. For example, a filter may be applied to processed data which is acquiring speech from a user to remove residual audio noise from a machine running in the environment.

The device 110 may perform beamforming to determine a plurality of portions or sections of audio received from a microphone array (e.g., directional portions). For example, the device 110 may use a first beamforming configuration that includes six portions or sections (e.g., Sections 1-6). For example, the device 110 may include six different microphones, may divide an area around the device 110 into six sections or the like. However, the present disclosure is not limited thereto and the number of microphones in the microphone array 112 and/or the number of portions/sections in the beamforming may vary. For example, the device 110 may use a second beamforming configuration including eight portions/sections (e.g., Sections 1-8) without departing from the disclosure. For example, the device 110 may include eight different microphones, may divide the area around the device 110 into eight portions/sections or the like.

The number of portions/sections generated using beamforming does not depend on the number of microphones in the microphone array. For example, the device 110 may include twelve microphones in the microphone array but may determine three portions, six portions or twelve portions of the audio data without departing from the disclosure. As discussed above, the beamformer may generate fixed beamforms (e.g., outputs of the FBF) or may generate adaptive beamforms using a Linearly Constrained Minimum Variance (LCMV) beamformer, a Minimum Variance Distortionless Response (MVDR) beamformer or other beamforming techniques. For example, the beamformer may receive the audio input, may determine six beamforming directions and output six fixed beamform outputs and six adaptive beamform outputs corresponding to the six beamforming directions. In some examples, the beamformer may generate six fixed beamform outputs, six LCMV beamform outputs and six MVDR beamform outputs, although the disclosure is not limited thereto.

Referring back to the AEC, the transfer functions h(n) characterize the acoustic "impulse response" of the room relative to the individual components. The impulse response, or impulse response function, of the room characterizes the signal from a microphone when presented with a brief input signal (e.g., an audible noise), called an impulse. The impulse response describes the reaction of the system as a function of time. If the impulse responses associated with the microphone array 112 and/or the loudspeaker(s) 114 are known, and the content of the playback audio data output by the loudspeaker(s) 114 is known, then the transfer functions h(n) can be used to estimate the actual loudspeaker-reproduced sounds that will be received by an individual microphone in the microphone array 112.

The room impulse response corresponds to acoustic characteristics of the room and may vary based on a size of the room, a number of acoustically reflective surfaces (e.g., walls, ceilings, large objects, etc.), a location of the device 110 within the room, or the like. For example, the loudspeaker(s) 114 may generate audible sounds at a first time and, at a second time soon after the first time, the microphone array 112 may detect strong original sound waves (e.g., incident sound waves) generated by the loudspeaker(s) 114, which may be referred to as "direct sound." If the device 110 is located in a center of a relatively large room (e.g., relatively large distance between the device 110 and a nearest acoustically reflective surface), there may be a lengthy time delay before a third time that the microphone array 112 detects reflected sound waves that are reflected by the acoustically reflective surfaces, which may be referred to as "reflections." As a magnitude of a sound wave is proportional to a distance traveled by the sound wave, the reflected sound waves may be relatively weak in comparison to the incident sound waves. In contrast, if the room is relatively small and/or the device 110 is located near an acoustically reflective surface, there may be a relatively short time delay before the microphone array 112 detects the reflected sound waves at the third time and the reflected sound waves may be stronger in comparison to the incident sound waves. If a first acoustically reflective surface is in proximity to the device 110 and a second acoustically reflective surface is distant from the device 110, the device 110 may detect "early reflections" reflected by the first acoustically reflective surface prior to detecting "late reflections" reflected by the second acoustically reflective surface.

For ease of explanation, the following descriptions may refer to the device 110 being located in a "room" and determining a "room impulse response" associated with the room. However, the disclosure is not limited thereto and the device 110 may be located in an "environment" or "location" (e.g., concert hall, theater, outdoor theater, outdoor area, etc.) without departing from the disclosure. Thus, the device 110 may determine an impulse response associated with the environment/location (e.g., environment impulse response, location impulse response, etc.), even if the environment/location does not correspond to a room per se, without departing from the disclosure.

For ease of explanation, the following descriptions may refer to a "wall" or "candidate wall" in order to provide a clear illustration of one or more techniques for estimating a distance and/or direction associated with an acoustically reflective surface. However, this is intended to provide a simplified example and the disclosure is not limited thereto. Instead, techniques used by the device 110 to estimate a distance and/or direction associated with a candidate wall may be applied to other acoustically reflective surfaces without departing from the present disclosure. Thus, while the following description may refer to techniques for determining a distance and/or direction associated with a candidate wall, one of skill in the art may apply the disclosed techniques to estimate a distance and/or direction associated with any acoustically reflective surface (e.g., ceiling, floor, object, etc.).

FIG. 2 illustrates examples of sound propagation in a room resulting in direct sound, early reflections and late reflections. As illustrated by environment chart 200 in FIG.

2, a room 210 (e.g., environment) may be comprised of a first wall 212, a second wall 214, a third wall 216 and a fourth wall 218. The device 110 may be located in proximity to a bottom-left corner of the environment chart 200 (e.g., near an intersection between the first wall 212 and the second wall 214).

If a loudspeaker 114 of the device 110 generates output audio at a first time, the microphone array 112 may detect direct sound 212, which corresponds to incident sound waves propagating directly from the loudspeaker 114 to the microphone array 112, at a second time soon after the first time. At a third time after the second time, the microphone array 112 may detect early reflections 224, which correspond to reflected sound waves that are reflected by nearby walls, such as a first early reflection 224a reflected by the first wall 212 and a second early reflection 224b reflected by both the first wall 212 and the second wall 214. At a fourth time after the third time, the microphone array 112 may detect late reflections 226, which correspond to reflected sound waves that are reflected by distant walls, such as a first late reflection 226a that is reflected by the first wall 212, the fourth wall 218, and the third wall 216 before being detected by the microphone array 112.

For ease of illustration, the environment chart 200 only illustrates a single reflection associated with each wall, but the present disclosure is not limited thereto and each wall may correspond to one or more reflections without departing from the disclosure.

The room 210 illustrated in the environment chart 200 may correspond to a room impulse response illustrated in room impulse response chart 230. The room impulse response chart 230 represents an amplitude (e.g., y-axis) of the room impulse response over time (e.g., x-axis). As illustrated in the room impulse response chart 230, the direct sound 222 corresponds to a first peak of the room impulse response, which occurs at a first time (e.g., $T_1$<10 ms) and has a relatively large amplitude (e.g., magnitude of the first peak is relatively high). The early reflections 224 correspond to a first series of peaks that occur after a short delay during a second time range (e.g., 10 ms<$T_2$<50 ms) and have smaller amplitudes than the first peak. For example, the first early reflection 224a may correspond to a second peak of the microphone audio data (e.g., 18 ms) and the second early reflection 224b may correspond to a third peak of the microphone audio data (e.g., 23 ms). Finally, the late reflections 226 correspond to a second series of peaks that occur after a lengthy delay during a third time range (e.g., 50 ms<$T_3$<250 ms) and have smaller amplitudes than the first series of peaks. For example, the first late reflection 226a may correspond to a fourth peak of the microphone audio data (e.g., 70 ms).

A time delay of a reflection (e.g., x-value associated with a corresponding peak) is proportional to a distance traveled by the reflected sound waves. Thus, the early reflections 224 correspond to candidate walls in proximity to the device 110 and the late reflections 226 correspond to candidate walls that are distant from the device 110. Based on the time delay associated with an individual peak in the room impulse response, the device 110 may determine a distance from the device 110 to a candidate wall corresponding to the individual peak, as will be described in greater detail below with regard to FIG. 6.

A room impulse response (RIR) of a room (e.g., location or environment) corresponds to acoustic characteristics of the room. To determine a value of an acoustic characteristic of an environment (e.g., MR of the environment), the device 110 may emit sounds at known frequencies (e.g., chirps, text-to-speech audio, music or spoken word content playback, etc.) and measure a reverberant signature of the environment. The device 110 may then use the reverberant signature of the environment to estimate the room impulse response. Measured over time in an ongoing fashion, the device 110 may be able to generate a consistent picture of the RIR and the reverberant qualities of the environment, thus better enabling the device 110 to determine or approximate where it is located in relation to walls or corners of the environment (assuming the device 110 is stationary). Further, if the device 110 is moved, the device 110 may be able to determine this change by noticing a change in the RIR pattern and may determine distances/directions to walls using the RIR. Thus, the room impulse response enables the device 110 to perform wall detection, range estimation, and/or angular estimation. Based on this information, the device 110 may determine a location of the device 110 within the room, a physical layout of the room, whether the device 110 is in a corner (e.g., where two or more walls or acoustically reflective surfaces meet) of the room (e.g., corner detection), or the like.

While the device 110 cannot directly measure a room impulse response, the device 110 may estimate the room impulse response based on an "aggregate" impulse response, which is a combination of the room impulse response (e.g., acoustic characteristics of a room or location) and a system impulse response (e.g., impulse response associated with the device 110, which is based on impulse responses specific to the loudspeaker(s) 114 and the microphone array 112). For example, a noisy estimate of the aggregate impulse response is given by:

$$h(n)=s(n)*r(n)+w(n) \quad [2]$$

where h(n) is the aggregate impulse response, s(n) is the system impulse response corresponding to impulse responses associated with the loudspeaker(s) 114 and the microphone array 112, r(n) is the room impulse response, which includes direct sound as well as all reflections, w(n) is a noise term, which can be assumed to be normally distributed and independent of all other terms, * denotes a mathematical convolution, and "n" is an audio sample.

The device 110 may determine the aggregate impulse response based on playback audio data that is output by the loudspeaker(s) 114 and microphone audio data generated by the microphone array 112. For example, microphone audio data y(n) corresponding to playback audio data x(n) is given by:

$$y(n)=x(n)*s(n)*r(n)+v(n) \quad [3]$$

where y(n) is the microphone audio data generated by the microphone array 112, x(n) is the playback audio data sent to the loudspeaker(s) 114, s(n) is the system impulse response, r(n) is the room impulse response, v(n) is a noise term, which can be assumed to be normally distributed and independent of all other terms, * denotes a mathematical convolution, and "n" is an audio sample.

Based on the playback audio data x(n) and the microphone audio data y(n), the device 110 may determine the aggregate impulse response h(n). As the device 110 has a fixed configuration between the loudspeaker(s) 114 and the microphone array 112, the device 110 knows the system response s(n). By removing the system impulse response s(n) from the aggregate impulse response h(n) (e.g., performing deconvolution), the device 110 can estimate the room impulse response r(n).

Figure 3:
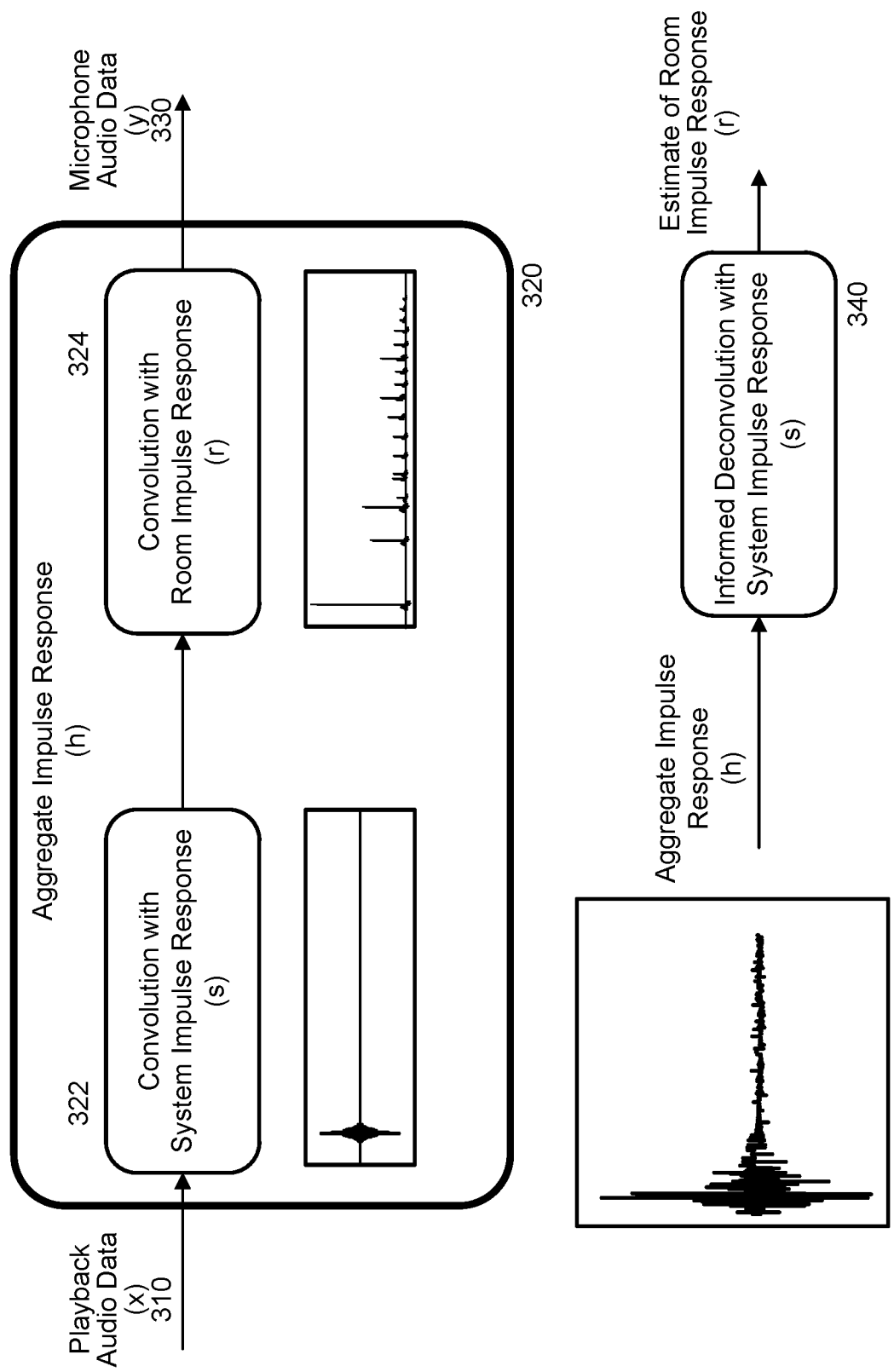
FIG. 3 illustrates an example of an aggregate impulse response and estimating a room impulse response according to embodiments of the present disclosure.

FIG. 3 illustrates an example of an aggregate impulse response and estimating a room impulse response according to embodiments of the present disclosure. As illustrated in FIG. 3, playback audio data (x) 310 (e.g., x(n)) is convolved with the aggregate impulse response (h) 320 (e.g., h(n)) to generate microphone audio data (y) 330 (e.g., y(n)). Specifically, the microphone audio data (y) 330 is generated by performing a first convolution 322 between the playback audio data (x) 310 and the system impulse response (s) (e.g., s(n)) and performing a second convolution 324 with the room impulse response (r) (e.g., r(n)).

Therefore, the device 110 may estimate the room impulse response (r) by determining the aggregate impulse response (h) 320 and performing an informed deconvolution 340 of the aggregate impulse response (h) 320 using the system impulse response (s) (e.g., deconvolve the system impulse response (s) out of the aggregate impulse response (h) 320), as will be described in greater detail below with regard to FIGS. 4A-4B. The system impulse response (s) is known by the device 110 based on previous testing. For example, the device 110 (or a similar device) may be placed in an anechoic chamber and a series of measurements may be taken to estimate the system impulse response (s).

As illustrated in FIG. 1, the device 110 may receive (130) playback audio data associated with the loudspeaker(s) 114 and may receive (132) microphone audio data from a first microphone. For example, the loudspeaker(s) 114 may generate audible sound(s) based on the playback audio data and the microphone audio data may capture at least a portion (e.g., echo) of the audible sound(s) (e.g., microphone audio data includes a representation of the audible sound(s)). The device 110 may determine (134) aggregate impulse response data based on the playback audio data and the microphone audio data, as discussed above with regard to FIG. 3. For example, the device 110 may determine the aggregate impulse response data based on differences between the playback audio data and the microphone audio data as well as Equations [2]-[3] described above.

The device 110 may determine (136) room impulse response data based on the aggregate impulse response data. For example, the device 110 may perform deconvolution to remove system impulse response data (known based on previous testing associated with the device 110) from the aggregate impulse response data, as will be described in greater detail below with regard to FIGS. 4A-4B. To determine the room impulse response data, the device 110 may perform a sparse deconvolution where a level of sparsity of the sparse deconvolution algorithm is controlled by an exponential decay constant λ.

A quantity is subject to exponential decay if it decreases at a rate proportional to its current value. For example, every reflection is subject to free space decay (e.g., assuming perfect reflectivity, an amplitude follows the ratio $$\frac{r(n_1)}{r(n_2)} = \frac{d(n_2)}{d(n_1)},$$

where d(n) corresponds to distance traveled). This means that given a lag index n (e.g., reflection number), the expected amplitude of a reflection is deterministic. Symbolically, this can be expressed as a differential equation $$\left(\text{e.g., } \frac{dN}{dt} = -\lambda N\right),$$

where N is the quantity and λ is a positive rate called the exponential decay constant. The solution to this equation is $N(t)=N_0 e^{-\lambda t}$, where N(t) is the quantity at time t and $N_0$=N (0) is the initial quantity (e.g., quantity at time t=0).

The device 110 may use the room impulse response data to detect an acoustically reflective surface and/or determine a distance to the acoustically reflective surface (e.g., candidate wall). To do this, the device 110 may detect (138) a first peak in the room impulse response data that corresponds to direct sound (e.g., incident sound waves propagating directly from the loudspeaker(s) 114 to the first microphone) and may determine (140) a first distance based on a first time delay associated with the first peak. For example, the first time delay is proportional to the first distance traveled by the incident sound waves and the first distance can be determined based on the speed of sound (e.g., sound waves travel approximately 34.3 centimeters per 1 millisecond).

When generating the room impulse response data, the device 110 aligns the system impulse response (s) and the aggregate impulse response (h) such that their largest peaks overlap. This ensures that the direct sound delay is zero and that the corresponding peak (e.g., first peak) appears in the room impulse response data at t=0. Therefore, the room impulse response data is time-shifted relative to the aggregate impulse response data, with the aggregate impulse response data indicating a time relative to the loudspeaker(s) 114 outputting the audible sound(s) and the room impulse response data indicating a time delay relative to the direct sound being received by the microphone array 112. Thus, the first time delay is not determined from the room impulse response data but is instead determined from the aggregate impulse response data and corresponds to an amount that the room impulse response data is time-shifted. For example, the first peak in the room impulse response data (e.g., direct sound) corresponds to a first peak in the aggregate impulse response data that is associated with a first time (e.g., x-axis coordinate of the first peak in the aggregate impulse response data), and the device 110 may determine the first time delay based on the first time. For example, if the loudspeaker(s) 114 generated the audible sound(s) at t=0 in the aggregate impulse response data, the first time delay is equal to the first time. Alternatively, if the loudspeaker(s) 114 generated the audible sound(s) at a second time in the aggregate impulse response data, the device 110 may determine the first time delay by subtracting the second time from the first time.

Knowing the first time delay, the device 110 may determine the first distance, which corresponds to a loudspeaker-microphone distance d(0) (e.g., distance between the loudspeaker(s) 114 and the first microphone). The device 110 may determine the first distance (e.g., d(0)) by multiplying the first time delay by the speed of sound (e.g., 343 m/s). Additionally or alternatively, the device 110 may already know the loudspeaker-microphone distance d(0) based on a configuration of the device 110 (e.g., the device 110 is programmed with the fixed distance between the loudspeaker(s) 114 and the microphone array 112). Knowing the speaker-microphone distance d(0), the device 110 may determine a distance travelled by each reflection in the room impulse response data, as discussed in greater detail below.

As illustrated in FIG. 1, the device 110 may detect (142) a second peak in the room impulse response data, may determine (144) a second distance based on a second time delay associated with the second peak, and may determine (146) a distance to an acoustically reflective surface associated with the second peak. These steps will be described in greater detail below with regard to FIGS. 5-6.

FIGS. 4A-4B illustrate examples of determining a room impulse response based on an aggregate impulse response according to embodiments of the present disclosure. As discussed above with regard to FIG. 3, the device 110 may determine aggregate impulse response data based on playback audio data and microphone audio data. For example, the device 110 may determine the aggregate impulse response data based on differences between the playback audio data and the microphone audio data as well as Equations [2]-[3] described above. Based on the aggregate impulse response data, the device 110 may determine room impulse response data. For example, the device 110 may perform deconvolution to remove system impulse response data (known based on previous testing associated with the device 110) from the aggregate impulse response data.

Room impulse responses can be broken into two distinct regions with a smooth transition. For example, a first region corresponds to early reflections, which tend to be sparse and impulse-like, whereas a second region corresponds to late reflections. After a sufficient amount of time has passed (depending on room geometry), the room impulse response consists of a superposition of many reflections, so that the late tail of the response (e.g., late reflections) is well modeled as a Gaussian.

When acoustically reflective surfaces are at a distance from the device 110, the device 110 may operate normally as audio received from a specific direction corresponds to audio generated in the direction. However, when acoustically reflective surfaces are in close proximity to the device 110, the acoustically reflective surfaces reflect sound waves such that the device 110 may detect audio arriving from a first direction (e.g., direct audio) and a second direction (e.g., reflections of the audio). Thus, the device 110 may improve performance by detecting acoustically reflective surfaces that are in close proximity to the device 110. To detect an acoustically reflective surface, the device 110 may assume that the early reflections correspond to primary reflections (e.g., sound waves reflected off of a single wall) and may use trigonometry to determine a distance to the acoustically reflective surface. Thus, each peak (e.g., non-zero component) in the room impulse response data corresponds to a unique acoustically reflective surface. While the device 110 may detect secondary reflections from a nearby wall before detecting a primary reflection from a distant wall, the device 110 does not need an accurate distance/direction associated with the distant wall as it is less likely to cause unwanted reflections that negatively impact processing of the device 110.

Thus, in order to determine the room impulse response data, the device 110 may perform a sparse deconvolution of the aggregate impulse response data, where a level of sparsity of the sparse deconvolution algorithm is controlled by an exponential decay constant. Sparsity is commonly modeled through Laplacian priors, resulting in convex, l-norm regularized, optimization problems.

As illustrated in FIG. 4A, a Laplacian prior with parameter $\lambda$ may be used on each element $r(n)$ of $r$, namely:

$$r(n) \sim \lambda_1 e^{-\lambda_1 r(n)} \qquad [4]$$

This may be referred to as a lasso problem and results in sparse estimates of r, where the level of sparsity is controlled by $\lambda_1$. Typically, a Laplacian prior results in implicit thresholding, where values close to 0 are set to 0, and a constraint value is lag-independent (e.g., constant for all reflections). Thus, the constraint value for early reflections is the same as the constraint value for late reflections (e.g., constraint value is proportional to the regularization parameters). Thus, the constraint value is not large enough for the early reflections and is too large for the late reflections.

As illustrated in FIG. 4A, a distribution chart 410 illustrates a probability density function of a Laplacian distribution for varying parameters $\lambda$. For example, a parameter of $\lambda=1$ has a gradual slope (e.g., y-coordinates decrease slowly along the x-axis) whereas a parameter of $\lambda=10$ has a very steep slope (e.g., exponentially decaying).

As reflections are subject to free space decay, where the decay is inversely proportional to the distance traveled. This means that given a lag index n, a lag-specific prior distribution is given by:

$$r(n) \sim \lambda_1(n) e^{-\lambda_1(n) r(n)} \qquad [5]$$

where the no lag-specific distribution parameter is now inversely proportional to n (i.e., the time delay or distance traveled). Thus:

$$\lambda_1(n) \sim \lambda \cdot \frac{1}{n} \qquad [6]$$

for some common scaling factor $\lambda$.

As illustrated in FIG. 4A, the sparse deconvolution algorithm may use an exponential prior on echoes, given by:

$$(r_i, \lambda_i) = \begin{cases} \lambda_i e^{-\lambda_i r_i}, & r_i \geq 0 \\ 0, & r_i < 0 \end{cases} \qquad [7]$$

and have decaying steepness $$\left(\text{e.g., } \lambda_i \propto \frac{1}{i}\right),$$

illustrated in lambda chart 420.

Such a prior results in the following optimization problem:

$$r^{MAP} = \operatorname{argmax}_r \log \mathcal{L}(h) = \operatorname{argmin}_r \|h - Sr\|^2 + \sum_{k=1}^{N} \lambda_1(k) \|r(k)\|, \text{ s.t. } r \geq 0 \qquad [8]$$

where $r^{MAP}$ is the maximum a posteriori probability (MAP) estimate for the room impule response, h is the aggregate impulse response, S is the system impulse response, r is the room impulse response, $\lambda_1$ is a parameter of the Laplacian prior (e.g., regularization parameter, distribution parameter, or the like), and s.t. stands for "subject to" (e.g., additional constraint that r is greater than or equal to zero). As shown in Equation [8], $\lambda_1(k)$ corresponds to a vector and not a single variable.

As illustrated in FIG. 4B, a maximum likelihood solution under this prior is:

$$r^o = \arg \min_r \|h - Sr\|_2^2 + \lambda^T r, \text{subject to } r \geq 0 \qquad [9]$$

where $r^o$ is the optimal room impulse response, h is the aggregate impulse response, S is the system impulse response, r is the room impulse response and $\lambda^T$ is a parameter of the Laplacian prior. The maximum likelihood solution may be referred to as sparse deconvolution algorithm 430, which includes least-squares fit 432, lasso (sparsity) 434 and is subject to a non-negativity constraint 436.

However, while Equation [9] includes the non-negativity constraint 436, the disclosure is not limited thereto and the optimal room impulse response may be determined without the non-negativity constraint 436 without departing from the disclosure.

The sparse deconvolution 430 may be pursued by means of a projected proximal gradient algorithm. The iteration is:

$$s_i = r_{i-1} - 2\mu(h - Sr_{i-1}) \quad [10]$$

$$t_i(n) = \begin{cases} s_i(n) - \mu\lambda_1(n) & \text{if } s_i(n) \geq \mu\lambda_1(n) \\ s_i(n) + \mu\lambda_1(n) & \text{if } s_i(n) \leq \mu\lambda_1(n) \\ 0 & \text{otherwise} \end{cases} \quad [11]$$

$$r_i(n) = \begin{cases} t_i(n) & \text{if } t_i(n) \geq 0 \\ 0 & \text{otherwise} \end{cases} \quad [12]$$

where Equation [10] corresponds to the gradient-step with respect to the differentiable lease-squares term, Equation [11] corresponds to the proximal step with respect to the regularizer, and Equation [12] accounts for the non-negativity constraint.

As discussed above, the non-zero components of the room impulse response data correspond to peaks in the aggregate impulse response data. Therefore, to simplify a description, the non-zero components of the room impulse response data may also be referred to as "peaks." However, the use of the term "peak" is intended to simplify a description of the room impulse response data and the disclosure is not limited thereto. Thus, any non-zero component of the room impulse response data may correspond to an acoustically reflective surface and may be referred to as a peak, even if there the non-zero component is not a local maximum (e.g., the non-zero component is not the highest amplitude in a series of data points). For example, if the room impulse response data has an amplitude of 0.18 at a first time (e.g., 14 ms) and 0.1 at a second time (e.g., 15 ms), the device 110 may determine a first distance corresponding to the first peak at the first time and a second distance corresponding to the second peak at the second time.

When generating the room impulse response data, the device 110 aligns the system impulse response (s) and the aggregate impulse response (h) such that their largest peaks overlap. This ensures that the direct sound delay is zero and that the corresponding peak appears in the room impulse response data at t=0. Therefore, the room impulse response data is time-shifted relative to the aggregate impulse response data, with the aggregate impulse response data indicating a time relative to the loudspeaker(s) 114 outputting the audible sound(s) and the room impulse response data indicating a time delay relative to the direct sound being received by the microphone array 112. Thus, each peak in the room impulse response data corresponds to a time delay (in ms) relative to the direct sound. For example, a first peak may be associated with a first time (e.g., 12 ms) in the aggregate impulse response data, which indicates that the first peak was received 12 ms after the loudspeaker(s) 114 outputted the audible sound(s), and is associated with a second time (e.g., 9 ms) in the room impulse response data, which indicates that the first peak was received 9 ms after the direct sound was received by the microphone(s) 112.

The device 110 may determine a first time delay associated with the direct sound based on the aggregate impulse response data, as the first time delay corresponds to an amount that the room impulse response data is time-shifted relative to the aggregate impulse response data. For example, an initial peak in the room impulse response data (e.g., direct sound at t=0 ms) corresponds to an initial peak in the aggregate impulse response data that is associated with a first time (e.g., t=3 ms), and the device 110 may determine the first time delay based on the first time. For example, if the loudspeaker(s) 114 generated the audible sound(s) at t=0 in the impulse response chart 440, the first time delay is equal to the first time. Alternatively, if the loudspeaker(s) 114 generated the audible sound(s) at a second time in the impulse response chart 440, the device 110 may determine the first time delay by subtracting the second time from the first time.

Knowing the first time delay, the device 110 may determine a first distance associated with the first peak (e.g., direct sound), which corresponds to a loudspeaker-microphone distance d(0) (e.g., distance between the loudspeaker(s) 114 and the first microphone). The device 110 may determine the first distance (e.g., d(0)) by multiplying the first time delay by the speed of sound (e.g., 343 m/s). Additionally or alternatively, the device 110 may already know the loudspeaker-microphone distance d(0) based on a configuration of the device 110 (e.g., the device 110 is programmed with the fixed distance between the loudspeaker(s) 114 and the microphone array 112).

Knowing the speaker-microphone distance d(0), the device 110 may determine a distance travelled by each reflection in the room impulse response data, the distance given by:

$$d(n) = d(0) + n \cdot T_s \cdot 343 \frac{\text{m}}{\text{s}}, \forall n > 0 \quad [13]$$

where d(n) is the distance travelled by the reflected sound waves, d(0) is the speaker-microphone distance, n is the reflection (e.g., lag index) associated with the reflected sound waves, $T_s$ is a time delay (in seconds) associated with the reflection (e.g., time associated with a peak in the room impulse response data), and $$343 \frac{\text{m}}{\text{s}}$$

is the speed of sound. The lag-specific (e.g., reflection-specific) regularization parameter is then obtained as:

$$\lambda_1(n) = \frac{\lambda}{d(n)} \quad [14]$$

where $\lambda_1(n)$ is the lag-specific regularization parameter (e.g., parameter value unique to an individual reflection or lag index), $\lambda$ is a common scaling factor used for all lag indexes, d(n) is the lag-specific distance (e.g., distance traveled by the reflected sound waves), and n is the reflection (e.g., lag index) associated with the reflected sound waves.

Figure 5:
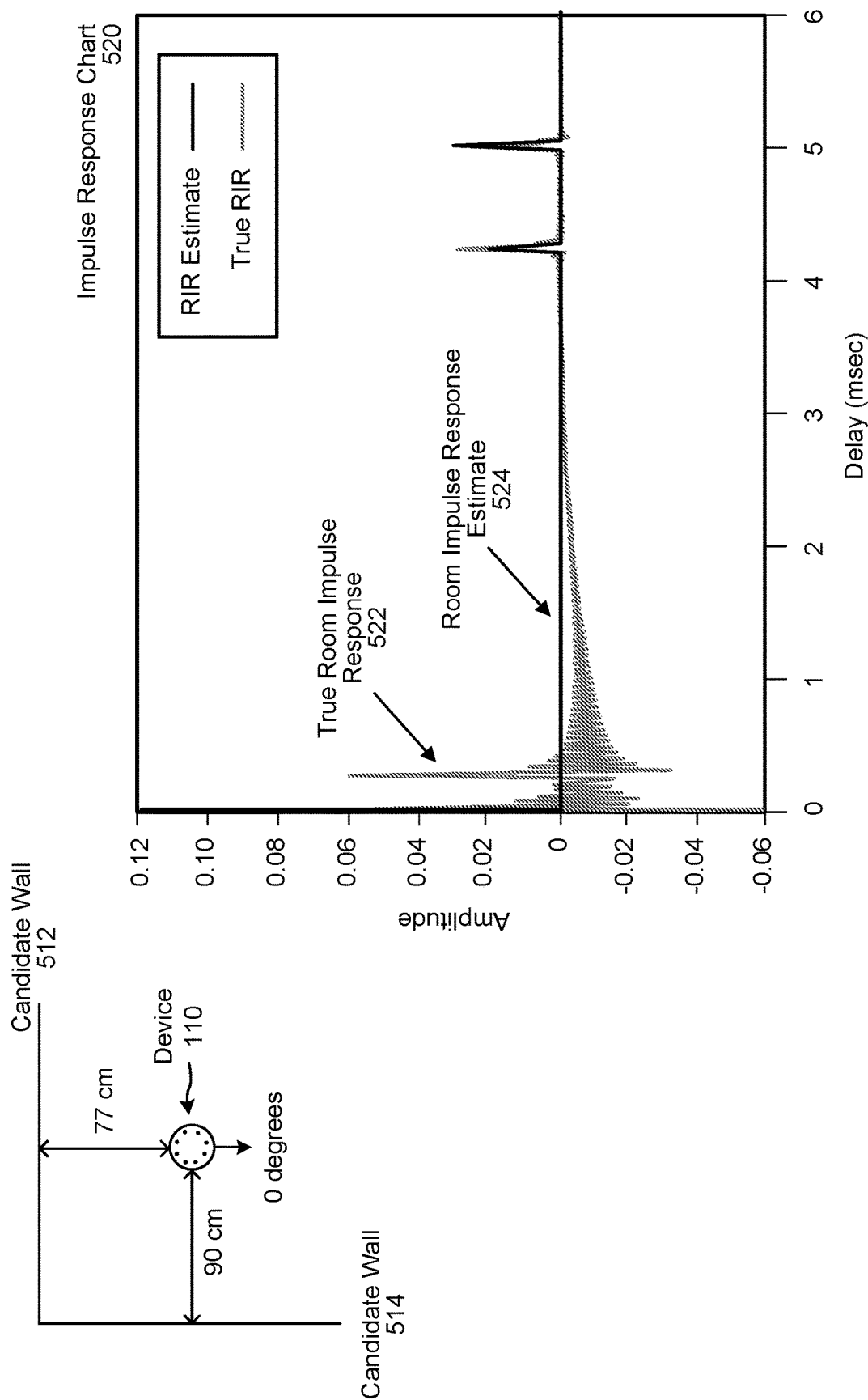
FIG. 5 illustrates an example of a true room impulse response and an estimated room impulse response according to embodiments of the present disclosure.

FIG. 5 illustrates an example of a true room impulse response and an estimated room impulse response according to embodiments of the present disclosure. As illustrated in FIG. 5, the device 110 may be located in a corner in proximity to a first candidate wall 512 and a second candidate wall 514. For example, the device 110 may be 77 cm from the first wall 512 and may be 90 cm from the second wall 514.

FIG. 5 includes an impulse response chart 520 that illustrates a true room impulse response 522 associated with the location of the device 110. The device 110 may perform the techniques discussed above to generate a room impulse response estimate 524, which is also illustrated in the impulse response chart 520. As illustrated in the impulse response chart 520, the room impulse response estimate 524 lacks some of the variations included in the true room impulse response 522 after a first peak (e.g., direct sound at t=0), but accurately estimates a second peak and a third peak. The second peak corresponds to the first candidate wall 512, whereas the third peak corresponds to the second candidate wall 514. Using a single microphone, the device 110 may determine a first distance to the first candidate wall 512 (e.g., 77 cm) and a second distance to the second candidate wall 514 (e.g., 90 cm), as will be described in greater detail below.

Figure 6:
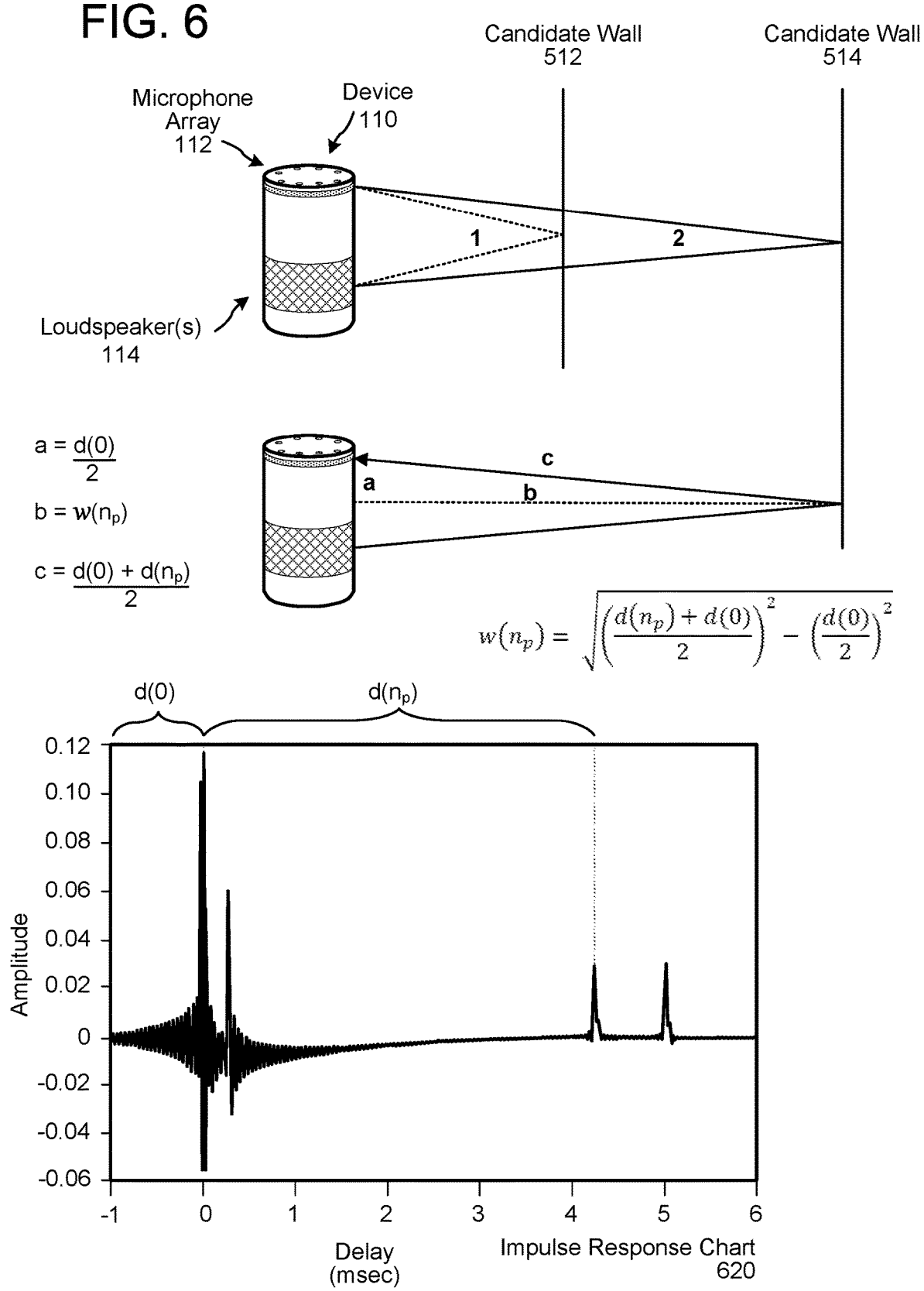
FIG. 6 illustrates an example of determining distances associated with candidate walls according to embodiments of the present disclosure.

FIG. 6 illustrates an example of determining distances associated with candidate walls according to embodiments of the present disclosure. As illustrated in FIG. 6, a device 110 may detect first reflected sound waves (1) associated with the first candidate wall 512 and may detect second reflected sound waves (2) associated with the second candidate wall 514. As illustrated in FIG. 6, the device 110 may generate audible sound(s) using the loudspeaker(s) 114 that are located near a bottom of the device 110. Incident sound waves associated with the audible sound(s) may propagate through the air in a first direction (e.g., toward the first candidate wall 512) until they reach the first candidate wall 512, at which point the first reflected sound waves (1) may be reflected by the first candidate wall 512 and propagate through the air until being detected by the microphone array 112 at the top of the device 110. Similarly, the incident sound waves may propagate through the air in a second direction (e.g., toward the second candidate wall 514) until they reach the second candidate wall 514, at which point the second reflected sound waves (2) may be reflected by the second candidate wall 514 and propagate through the air until being detected the microphone array 112 at the top of the device 110.

As discussed above, a loudspeaker-microphone distance d(0) associated with incident sound waves (e.g., direct sound) may be determined based on a first peak in the aggregate impulse response data, which may correspond to a time-offset of the room impulse response data. A first distance traveled by the first reflected sound waves (1) may be determined based on a first time delay from when the microphone array 112 detected the incident sound waves (e.g., direct sound) to when the microphone array 112 detected the first reflected sound waves (1) (e.g., second peak in the room impulse response data). Thus, the first distance may be determined by summing the loudspeaker-microphone distance d(0) (e.g., distance corresponding to the time delay between the loudspeaker(s) 114 generating the audible sound(s) and the microphone array 112 detecting the incident sound waves) and a first peak distance d($n_1$) (e.g., distance corresponding to the first time delay associated with the second peak in the room impulse response data). Similarly, a second distance traveled by the second reflected sound waves (2) may be determined based on a second time delay from when the microphone array 112 detected the incident sound waves to when the microphone array 112 detected the second reflected sound waves (2) (e.g., third peak in the room impulse response data). Thus, the second distance may be determined by summing the loudspeaker-microphone distance d(0) (e.g., distance corresponding to the time delay between the loudspeaker(s) 114 generating the audible sound(s) and the microphone array 112 detecting the incident sound waves) and a second peak distance d($n_2$) (e.g., distance corresponding to the second time delay associated with the third peak in the room impulse response data).

The device 110 may determine a distance from the device 110 to a wall candidate using trigonometry. For example, as the device 110 knows the distance traveled by the reflected sound waves and the loudspeaker-microphone distance d(0), the device 110 may estimate a wall distance w($n_p$) using the Pythagorean theorem (e.g., $a^2+b^2=c^2$). As illustrated in FIG. 6, a straight line from the device 110 to the second candidate wall 514 (e.g., b) bisects the path of the second reflected sound waves (2), creating a right triangle. A first side (e.g., "a") of the triangle has a length equal to half of the loudspeaker-microphone distance d(0) (e.g., a=d(0)/2), a second side (e.g., "b") of the triangle corresponds to the wall distance w($n_p$) (e.g., b=w($n_p$)), and a third side (e.g., "c") of the triangle has a length equal to half of the distance traveled by the second reflected sound waves (2) (e.g., c=(d(0)+d($n_p$))/2).

The device 110 may determine the wall distance w($n_p$) associated with the second candidate wall 514 using the following equation:

$$w(n_p) = \sqrt{\left(\frac{d(n_p)+d(0)}{2}\right)^2 - \left(\frac{d(0)}{2}\right)^2} \quad [15]$$

where w($n_p$) is the wall distance associated with the second candidate wall 514, d($n_p$) is the second peak distance corresponding to the second time delay associated with the second peak in the room impulse response data, and d(0) is the loudspeaker-microphone distance. In addition to the wall distance, the device 110 may also use trigonometry to determine an elevation angle associated with the second candidate wall 514.

Figure 7:
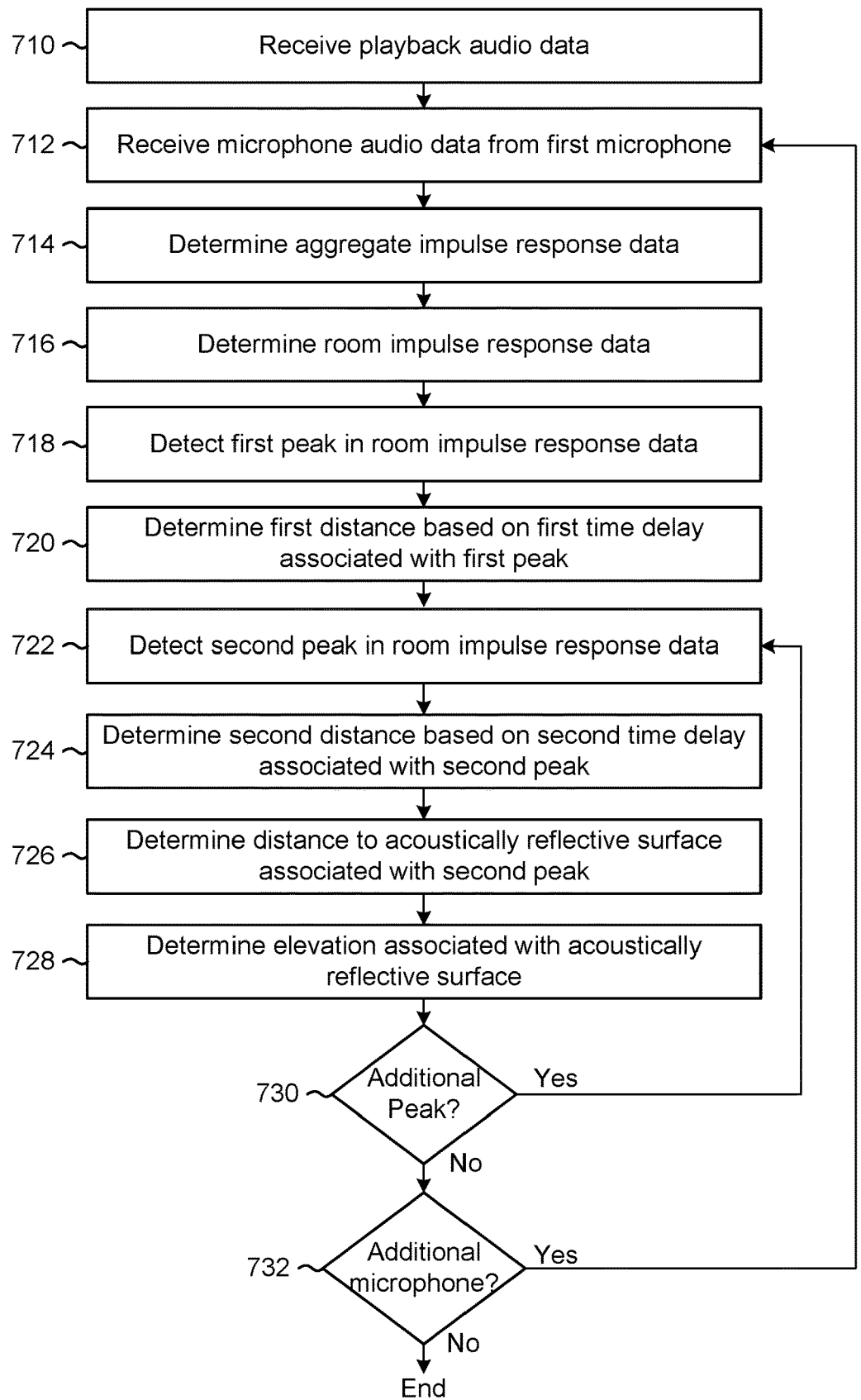
FIG. 7 is a flowchart conceptually illustrating an example method for determining distances and elevations associated with acoustically reflective surfaces according to embodiments of the present disclosure.

FIG. 7 is a flowchart conceptually illustrating an example method for determining distances and elevations associated with acoustically reflective surfaces according to embodiments of the present disclosure. As illustrated in FIG. 7, the device 110 may receive (710) playback audio data associated with audible sound(s) output by the loudspeaker(s) 114 and may receive (712) microphone audio data from a first microphone. Based on the playback audio data and the microphone audio data, the device 110 may determine (714) aggregate impulse response data.

The aggregate impulse response data corresponds to system impulse response data convolved with room impulse response data. Thus, the device 110 may determine (716) the room impulse response data by performing a deconvolution to remove the system impulse response data from the aggregate impulse response data. To determine the room impulse response data, the device 110 may apply a sparse deconvolution algorithm where a level of sparsity of the sparse deconvolution algorithm is controlled by an exponential decay constant. The sparse deconvolution algorithm is discussed in greater detail above with regard to FIGS. 4A-4B and Equations [8]-[12].

Based on the room impulse response data, the device 110 may determine a distance and/or elevation associated with an acoustically reflective surface (e.g., wall, ceiling, large object, or the like). For example, each peak (e.g., non-zero element) in the room impulse response data indicates a reflection and may correspond to an acoustically reflective surface. The device 110 may detect (718) a first peak in the room impulse response data and may determine (720) a first distance based on a first time delay associated with the first peak. For example, the first peak may correspond to incident sound waves (e.g., direct sound) from the loudspeaker(s) 114 to the first microphone and the device 110 may determine the first time delay based on when the incident sound waves were detected in the aggregate impulse response data. The first time delay corresponds to a time offset between the aggregate impulse response data and the room impulse response data, as the room impulse response data measures a time delay from when the direct sound is detected by the first microphone (e.g., first peak in the room impulse response occurs at t=0). The device 110 may determine the first distance based on a speed of sound (e.g., 343 m/s) and the first time delay. The first distance corresponds to a loudspeaker-microphone distance d(0), described in greater detail above.

The device 110 may detect (722) a second peak in the room impulse response data and may determine (724) a second distance based on a second time delay associated with the second peak. For example, the second peak may correspond to reflected sound waves (e.g., early reflection) reflected by the acoustically reflective surface and the device 110 may determine the second time delay based on the second peak. Thus, the second time delay corresponds to a time difference between the first peak and the second peak. The device 110 may determine the second distance based on a speed of sound (e.g., 343 m/s) and the second time delay. The device 110 may determine a total distance traveled by the reflected sounds waves by summing the first distance (e.g., loudspeaker-microphone distance d(0)) and the second distance (e.g., distance $d(n_1)$ associated with the second peak in the room impulse response data).

The device 110 may determine (726) a distance to an acoustically reflective surface associated with the second peak and may determine (728) an elevation associated with the acoustically reflective surface based on the first distance (e.g., loudspeaker-microphone distance d(0)) and the total distance (e.g., $d(0)+d(n_1)$), as discussed above with regard to FIG. 6.

The device 110 may determine (730) if there is an additional peak represented in the room impulse response data and, if so, may loop to step 722 to repeat steps 722-728 for the additional peak. If there are no additional peaks represented in the room impulse response data, the device 110 may determine (732) if there is an additional microphone (e.g., second microphone audio data) and, if so, may loop to step 712 to repeat steps 722-730 for the additional microphone. If there are no additional microphones, the device 110 may end the process and apply the distance and/or direction associated with the acoustically reflective surface to improve a performance of the device 110.

In addition to the distance(s) and the elevation(s) associated with the acoustically reflective surfaces, in some examples the device 110 may use multiple microphones of the microphone array 112 to determine direction(s) associated with the acoustically reflective surfaces. By determining the room impulse response, distance(s), elevation(s), and/or direction(s) associated with the acoustically reflective surface(s), the device 110 may improve a performance of the device 110 in several different applications. For example, the device 110 may improve fixed-beamformer selection, environment-adaptive beamforming, device arbitration, and/or adaptive echo cancellation, although the disclosure is not limited thereto.

When look directions and beam coefficients of a beamformer are fixed, the device 110 needs to make a decision as to which beam to select for speech recognition. Generally, the goal is to select the beam which points in the direction of a user speaking (e.g., speech direction). A typical approach is to estimate the per-beam signal-to-noise ratio (SNR) and pick the beam with the highest signal-to-noise ratio. While this approach is simple, it does not take into account walls in the vicinity of the device 110, which result in reflections. For example, when the device 110 is placed in the vicinity of an acoustically reflective surface (e.g., wall), the SNR is no longer a good proxy to estimate a speech direction since reflections from the wall have approximately the same power as the direction sound. Depending on the angle of incidence and the beam look directions, the signal power of a beam pointing towards the wall may be larger than that of the beam pointing in the speech direction.

However, knowing distance(s)/elevation(s)/direction(s) of the acoustically reflective surfaces around the device 110, along with a relative location of the acoustically reflective surfaces and/or the device 110, enables the device 110 to disqualify look directions pointing towards the walls and focus beams onto the relevant half-plane (or quarter-plane when the device 110 is positioned in a corner). In some examples, the device 110 may disqualify (e.g., ignore) beams pointing towards a wall, reducing a number of beams from which to select. Additionally or alternatively, the device 110 may redirect the beams to ignore look directions pointing towards the wall, increasing an angular resolution of the beamformer (e.g., each beam is associated with a smaller angle and is therefore more focused).

In conjunction with this information, by tracking which lobe of a beampattern the device 110 most often selects as having the strongest spoken signal path over time, the device 110 may begin to notice patterns in which lobes are selected. If a certain set of lobes (or microphones) is selected, the device can heuristically determine the user's typical speaking location in the environment. The device may devote more CPU resources to digital signal processing (DSP) techniques for that lobe or set of lobes. For example, the device 110 may run acoustic echo cancellation (AEC) at full strength across the three most commonly targeted lobes, instead of picking a single lobe to run AEC at full strength. The techniques may thus improve subsequent automatic speech recognition (ASR) and/or speaker recognition results as long as the device is not rotated or moved. And, if the device 110 is moved, the techniques may help the device to determine this change by comparing current RIR results to historical ones to recognize differences that are significant enough to cause the device to begin processing the signal coming from all lobes approximately equally, rather than focusing only on the most commonly targeted lobes.

Criterion and algorithms that generate filter coefficients for specific look directions are generally derived under free-space assumptions, both as they pertain to signal propagation and the noise model (e.g., MVDR and LCMV criterions). Therefore, the device 110 may improve environment-adaptive beamforming as knowledge of the geometry around the device (e.g., acoustically reflective surfaces in proximity to the device 110 and/or a general layout of the room) can be leveraged to move beyond the simplifying free-space assumption and improve beam shapes.

Typically, device arbitration is performed based on an estimated signal-to-noise ratio. However, the device 110 may improve device arbitration as knowledge of the environment around the device can be a feature for device arbitration. For example, if a first device is in a corner of a room and a second device is away from acoustically reflective surfaces, device arbitration may take into account the environment (e.g., relative locations of the acoustically reflective surfaces) and select the second device.

Typically, acoustic echo cancellation (AEC) or adaptive noise cancellation is fed reference audio data and microphone audio data and estimates an aggregate impulse response, which consists of a system impulse response and a room impulse response. However, the device 110 may improve adaptive noise cancellation using a sparse, informed echo canceller. For example, the system impulse response is approximately known a priori, so the device 110 may estimate the room impulse response using a sparse adaptive filter.

To determine a direction associated with an acoustically reflective surface, the device 110 may perform the techniques discussed above to generate an aggregate impulse response and/or a room impulse response using second microphone audio data associated with a second microphone. To improve an accuracy of the direction estimate, the device 110 may use more microphones in the microphone array 112. For example, if the microphone array 112 includes eight individual microphones, the device 110 may determine an aggregate impulse response and/or a room impulse response using each of the eight microphones and may estimate the direction associated with each candidate wall using several different techniques, which will be described in greater detail below with regard to FIGS. 8-11.

Figure 8:
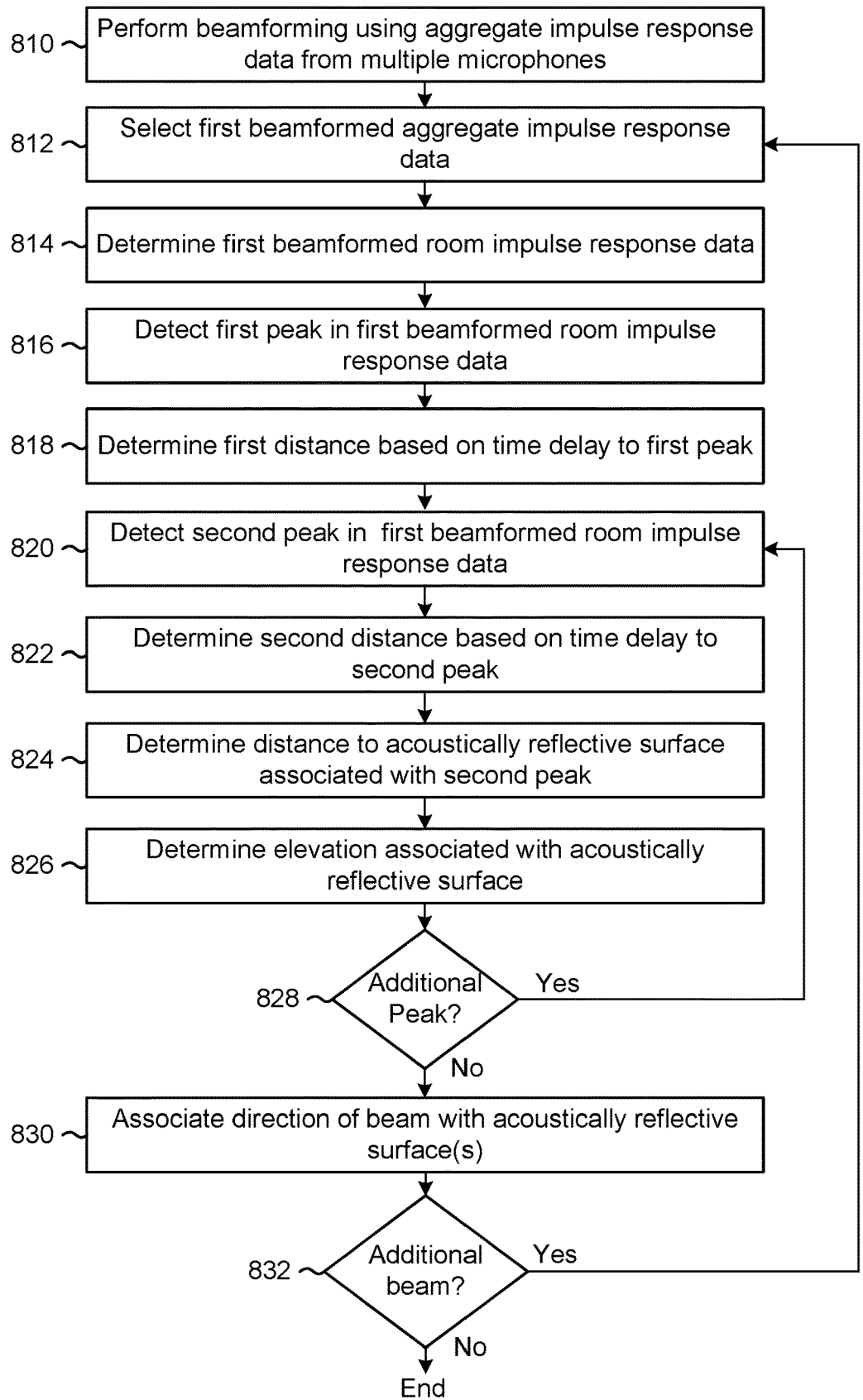
FIG. 8 is a flowchart conceptually illustrating an example method of a first technique for determining directions associated with acoustically reflective surfaces according to embodiments of the present disclosure.

FIG. 8 is a flowchart conceptually illustrating an example method of a first technique for determining directions associated with acoustically reflective surfaces according to embodiments of the present disclosure. The first technique determines a direction associated with an acoustically reflective surface by performing beamforming on aggregate impulse response data associated with multiple microphones in the microphone array 112 (e.g., first aggregate impulse response data associated with a first microphone, second aggregate impulse response data associated with a second microphone, and so on). For example, the device 110 may generate first beamformed aggregate impulse response data associated with a first direction, second beamformed aggregate impulse response data associated with a second direction, and so on for each of the beams. The beamformed aggregate impulse response data is similar to the aggregate impulse response data determined in step 714, except each beamformed aggregate impulse response data is associated with a unique direction (e.g., beam). The device 110 may apply a sparse deconvolution algorithm, which is described in greater detail above with regard to FIGS. 4A-4B, and may generate beamformed room impulse response data from the beamformed aggregate impulse response data.

As illustrated in FIG. 8, the device 110 may perform (810) beamforming using aggregate impulse response data from multiple microphones. For example, the device 110 may use first microphone audio data associated with a first microphone to generate first aggregate impulse response data, may use second microphone audio data associated with a second microphone to generate second aggregate impulse response data, and so on. Due to the close proximity between the microphones in the microphone array 112, the first aggregate impulse response data may be relatively similar to the second aggregate impulse response data. However, the beamforming process focuses on differences between them, especially differences in timing (e.g., when reflected sound waves are detected by an individual microphone), in order to associate certain signals with a particular direction. For example, based on slight delays in when the reflected sound waves are detected by each microphone, the device 110 may determine that the reflected sound waves were first detected by a particular microphone and may associate the reflected sound waves with a direction associated with the microphone.

The device 110 may select (812) first beamformed aggregate impulse response data (e.g., select aggregate impulse response data associated with a first beam or direction) and may determine (814) first beamformed room impulse response data based on the first beamformed aggregate impulse response data. For example, the device 110 may perform the same steps described above with regard to FIGS. 4A-4B to apply a sparse deconvolution algorithm and generate the first beamformed room impulse response data from the first beamformed aggregate impulse response data.

Based on the room impulse response data, the device 110 may then determine the distance and/or elevation associated with an acoustically reflective surface in a particular direction using the techniques described above with regard to steps 718-728. For example, each peak (e.g., non-zero element) in the first beamformed room impulse response data indicates a reflection and may correspond to an acoustically reflective surface. The device 110 may detect (816) a first peak in the first beamformed room impulse response data and may determine (818) a first distance based on a first time delay associated with the first peak. For example, the first peak may correspond to incident sound waves (e.g., direct sound) from the loudspeaker(s) 114 to the first microphone and the device 110 may determine the first time delay based on when the incident sound waves were detected in the first beamformed aggregate impulse response data. The first time delay corresponds to a time offset between the first beamformed aggregate impulse response data and the first beamformed room impulse response data, as the first beamformed room impulse response data measures a time delay from when the direct sound is detected by the first microphone (e.g., first peak in the first beamformed room impulse response occurs at t=0). The device 110 may determine the first distance based on a speed of sound (e.g., 343 m/s) and the first time delay. The first distance corresponds to a loudspeaker-microphone distance d(0), described in greater detail above.

The device 110 may detect (820) a second peak in the first beamformed room impulse response data and may determine (822) a second distance based on a second time delay associated with the second peak. For example, the second peak may correspond to reflected sound waves (e.g., early reflection) reflected by the acoustically reflective surface and the device 110 may determine the second time delay based on the second peak. Thus, the second time delay corresponds to a time difference between the first peak and the second peak. The device 110 may determine the second distance based on a speed of sound (e.g., 343 m/s) and the second time delay. The device 110 may determine a total distance traveled by the reflected sounds waves by summing the first distance (e.g., loudspeaker-microphone distance d(0)) and the second distance (e.g., distance $d(n_1)$ associated with the second peak in the first beamformed room impulse response data).

The device 110 may determine (824) a distance to an acoustically reflective surface associated with the second peak and may determine (826) an elevation associated with the acoustically reflective surface based on the first distance (e.g., loudspeaker-microphone distance d(0)) and the total distance (e.g., $d(0)+d(n_1)$), as discussed above with regard to FIG. 6.

The device 110 may determine (828) if there is an additional peak represented in the first beamformed room impulse response data and, if so, may loop to step 820 to repeat steps 820-826 for the additional peak. If there are no additional peaks represented in the first beamformed room impulse response data, the device 110 may associate (830) a direction of the beam with the acoustically reflective surface(s). For example, a first direction associated with the first beam may be associated with one or more peaks represented in the first beamformed room impulse response data and corresponding acoustically reflective surface(s).

The device 110 may determine (832) if there is an additional beam (e.g., second beam corresponding to a second direction, third beam corresponding to a third direction, etc.) and, if so, may loop to step 812 to repeat steps 812-832 for the additional beam. If there are no additional beams, the device 110 may end the process and apply the distance and/or direction associated with the acoustically reflective surface to improve a performance of the device 110.

FIG. 9 illustrates examples of beamformed aggregate impulse responses and beamformed room impulse responses according to embodiments of the present disclosure. As illustrated in FIG. 9, a beamformed impulse response chart 910 includes noisy, beamformed impulse responses that don't really illustrate anything. In contrast, filtered impulse response chart 920 (e.g., which has the same dimensions as the beamformed impulse response chart 910) and filtered impulse response chart 922 (e.g., zoomed in version) highlight the three visible non-zero beams at 180 degrees, 270 degrees and 300 degrees.

Figure 10:
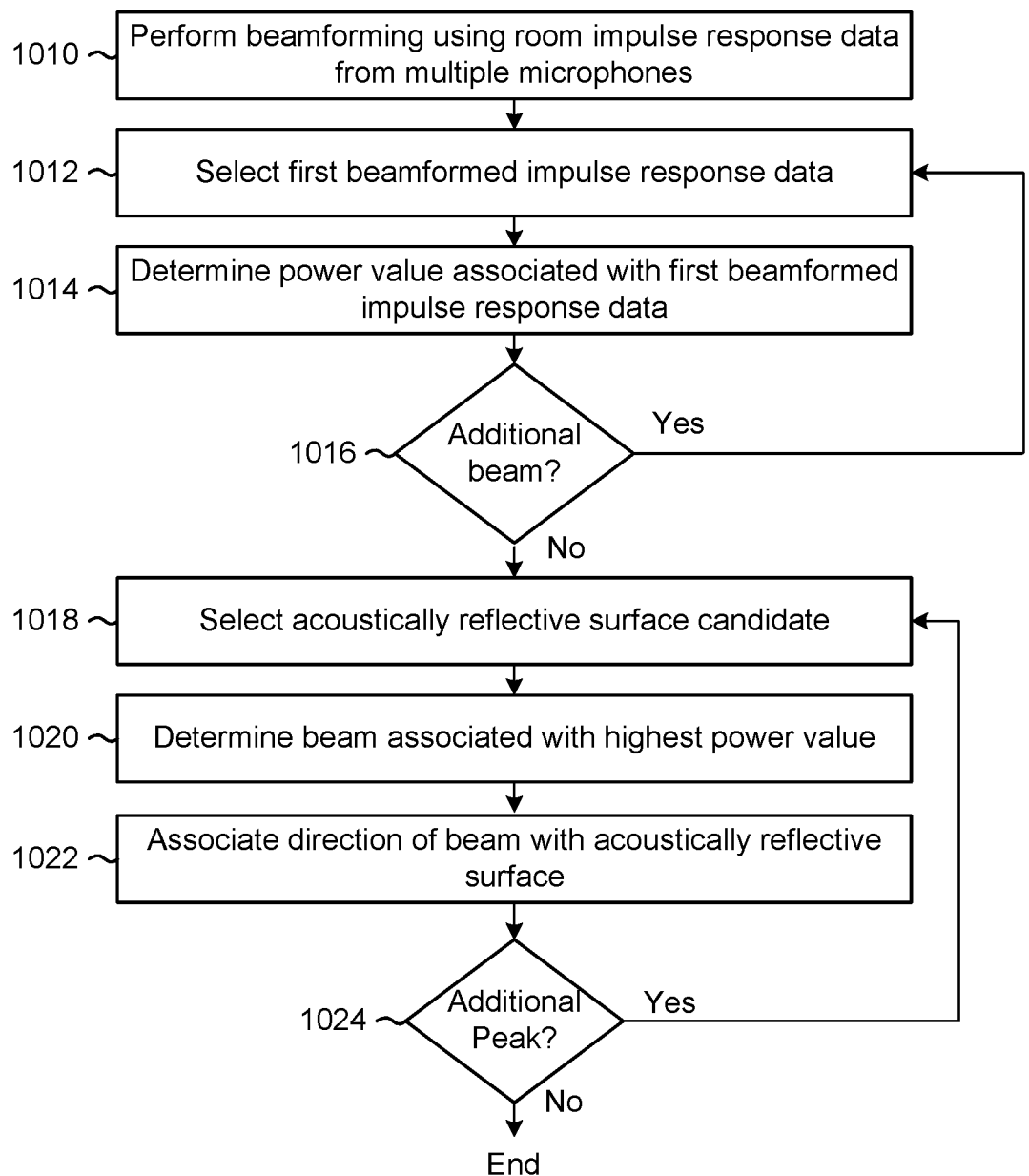
FIG. 10 is a flowchart conceptually illustrating an example method of a second technique for determining directions associated with acoustically reflective surfaces according to embodiments of the present disclosure.

FIG. 10 is a flowchart conceptually illustrating an example method of a second technique for determining directions associated with acoustically reflective surfaces according to embodiments of the present disclosure. The second technique determines a direction associated with an acoustically reflective surface by performing beamforming on aggregate impulse response data associated with multiple microphones in the microphone array 112 (e.g., first aggregate impulse response data associated with a first microphone, second aggregate impulse response data associated with a second microphone, and so on). For example, the device 110 may generate first beamformed aggregate impulse response data associated with a first direction, second beamformed aggregate impulse response data associated with a second direction, and so on for each of the beams. The beamformed aggregate impulse response data is similar to the aggregate impulse response data determined in step 714, except each beamformed aggregate impulse response data is associated with a unique direction (e.g., beam). The device 110 may determine a power calculation for each beam and pick candidate beams with a highest amount of power.

As illustrated in FIG. 10, the device 110 may perform (1010) beamforming using aggregate impulse response data from multiple microphones. For example, the device 110 may use first microphone audio data associated with a first microphone to generate first aggregate impulse response data, may use second microphone audio data associated with a second microphone to generate second aggregate impulse response data, and so on. Due to the close proximity between the microphones in the microphone array 112, the first aggregate impulse response data may be relatively similar to the second aggregate impulse response data. However, the beamforming process focuses on differences between them, especially differences in timing (e.g., when reflected sound waves are detected by an individual microphone), in order to associate certain signals with a particular direction. For example, based on slight delays in when the reflected sound waves are detected by each microphone, the device 110 may determine that the reflected sound waves were first detected by a particular microphone and may associate the reflected sound waves with a direction associated with the microphone.

The device 110 may select (812) first beamformed aggregate impulse response data (e.g., select aggregate impulse response data associated with a first beam or direction), may determine (1014) a power value associated with the first beamformed aggregate impulse response data, may determine (1016) if there is an additional beam, and, if so, may loop to step 1012 to repeat steps 1012-1014.

If there is not an additional beam, the device 110 may select (1018) an acoustically reflective surface candidate, determine (1020) a beam associated with a highest power value, associate (1022) a direction of the beam with the acoustically reflective surface, determine (1024) whether there is an additional peak, and, if so, may loop to step 1018 to repeat steps 1018-1022 for the additional peak.

Figure 11:
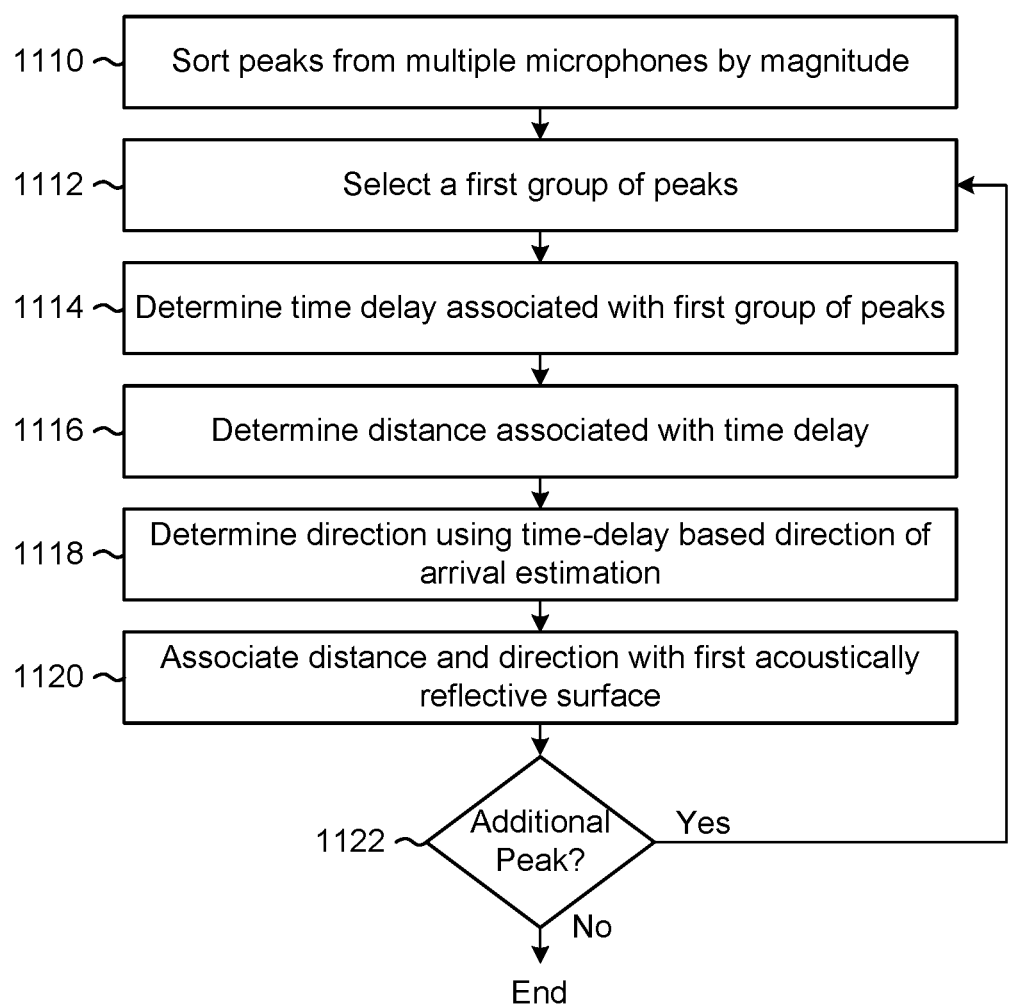
FIG. 11 is a flowchart conceptually illustrating an example method of a third technique for determining directions associated with acoustically reflective surfaces according to embodiments of the present disclosure.

FIG. 11 is a flowchart conceptually illustrating an example method of a third technique for determining directions associated with acoustically reflective surfaces according to embodiments of the present disclosure. Instead of performing beamforming as in the first technique or the second technique, the third technique groups peaks corresponding to the same acoustically reflective surfaces together and determines a direction associated with the acoustically reflective surfaces using a time-delay based Direction of Arrival (DOA) estimation.

As illustrated in FIG. 11, the device 110 may sort (1110) peaks from multiple microphones based on a magnitude. The device 110 may select (1012) a first group of peaks, determine (1114) a time delay associated with the first group of peaks, determine (1116) a distance associated with the time delay, determine (1118) a direction using time-delay based direction of arrival estimation, and associate (1120) distance and direction with the first acoustically reflective surface. The device 110 may determine (1122) if there is an additional peak and, if so, may loop to step 1112 and repeat steps 1112-1120.

FIG. 12 is a block diagram conceptually illustrating example components of the system 100. In operation, the system 100 may include computer-readable and computer-executable instructions that reside on the device 110, as will be discussed further below.

The system 100 may include one or more audio capture device(s), such as a microphone 112 or an array of microphones 112. The audio capture device(s) may be integrated into the device 110 or may be separate. The system 100 may also include an audio output device for producing sound, such as loudspeaker(s) 114. The audio output device may be integrated into the device 110 or may be separate.

The device 110 may include an address/data bus 1224 for conveying data among components of the device 110. Each component within the device 110 may also be directly connected to other components in addition to (or instead of) being connected to other components across the bus 1224.

The device 110 may include one or more controllers/processors 1204, which may each include a central processing unit (CPU) for processing data and computer-readable instructions, and a memory 1206 for storing data and instructions. The memory 1206 may include volatile random access memory (RAM), non-volatile read only memory (ROM), non-volatile magnetoresistive (MRAM) and/or other types of memory. The device 110 may also include a data storage component 1208, for storing data and controller/processor-executable instructions. The data storage component 1208 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1202.

Computer instructions for operating the device 110 and its various components may be executed by the controller(s)/ processor(s) 1204, using the memory 1206 as temporary "working" storage at runtime. The computer instructions may be stored in a non-transitory manner in non-volatile memory 1206, storage 1208, or an external device. Alternatively, some or all of the executable instructions may be embedded in hardware or firmware in addition to or instead of software.

The device 110 includes input/output device interfaces 1202. A variety of components may be connected through the input/output device interfaces 1202, such as the microphone array 112, the loudspeaker(s) 114, and a media source such as a digital media player (not illustrated). The input/output interfaces 1202 may include A/D converters for converting the output of microphone 112 into microphone audio data, if the microphones 112 are integrated with or hardwired directly to device 110. If the microphones 112 are independent, the A/D converters will be included with the microphones, and may be clocked independent of the clocking of the device 110. Likewise, the input/output interfaces 1202 may include D/A converters for converting playback audio data into an analog current to drive the loudspeakers 114, if the loudspeakers 114 are integrated with or hardwired to the device 110. However, if the loudspeakers are independent, the D/A converters will be included with the loudspeakers, and may be clocked independent of the clocking of the device 110 (e.g., conventional Bluetooth loudspeakers).

The input/output device interfaces 1202 may also include an interface for an external peripheral device connection such as universal serial bus (USB), FireWire, Thunderbolt or other connection protocol. The input/output device interfaces 1202 may also include a connection to one or more networks 10 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving, by a device located in a room, first audio data associated with audible sound output by a loudspeaker of the device;
    receiving, by the device, second audio data from a first microphone of the device, the second audio data including a first representation of the audible sound;
    receiving third audio data from a second microphone of the device, the third audio data including a second representation of the audible sound;
    determining first aggregate impulse response data associated with the first microphone;
    determining second aggregate impulse response data associated with the second microphone;
    determining, based on the first aggregate impulse response data, a first model that corresponds to at least a first probability density function, wherein the first model is subject to exponential decay;
    determining, based on the second aggregate impulse response data, a second model that corresponds to at least a second probability density function, wherein the second model is subject to exponential decay;
    determining, using the first model, first room impulse response data corresponding to the room and associated with the first microphone;
    determining, using the second model, second room impulse response data corresponding to the room and associated with the second microphone;
    determining a first nonzero value in the first room impulse response data, the first nonzero value corresponding to first reflected sound waves associated with the audible sound, the first reflected sound waves corresponding to a wall;
    determining a first time associated with the first nonzero value, the first time corresponding to the first microphone detecting the first reflected sound waves;
    determining a second nonzero value in the second room impulse response data, the second nonzero value corresponding to second reflected sound waves associated with the audible sound, the second reflected sound waves corresponding to the wall;
    determining a second time associated with the second nonzero value, the second time corresponding to the second microphone detecting the second reflected sound waves;
    determining, using at least one of the first time or the second time, a first distance from the device to the wall; and determining, based on a delay between the first time and the second time, a first direction associated with the wall.

2. The computer-implemented method of claim 1, wherein determining the first distance further comprises:
   determining a third nonzero value in the first room impulse response data, the third nonzero value corresponding to incident sound waves associated with the audible sound;
   determining a third time associated with the third nonzero value, the third time corresponding to the first microphone detecting the incident sound waves;
   determining, based on the third time, a first time delay indicating an amount of time elapsed from the loudspeaker generating the audible sound and the first microphone detecting the incident sound waves;
   determining, based on the first time, a second time delay indicating an amount of time elapsed from the loudspeaker generating the audible sound and the first microphone detecting the first reflected sound waves;
   determining a second distance between the loudspeaker and the first microphone by multiplying the first time delay by a speed of sound;
   determining a third distance by multiplying the second time delay by the speed of sound, the third distance being a sum of a fourth distance between the loudspeaker and the wall and a fifth distance between the wall and the first microphone; and
   determining the first distance based on the second distance and the third distance using Pythagorean theorem.

3. The computer-implemented method of claim 1, further comprising:
   determining, based on the first room impulse response data and the second room impulse response data, a plurality of beamformed data comprising:
      first beamformed data corresponding to the first direction, and
      second beamformed data corresponding to a second direction;
   determining a first power value associated with the first beamformed data;
   determining a second power value associated with the second beamformed data;
   determining that the first power value is greater than the second power value; and
   determining that the wall is in the first direction.

4. The computer-implemented method of claim 1, further comprising:
   determining a third nonzero value in the first room impulse response data, the third nonzero value corresponding to a third time;
   determining, based on the third time, a second distance from the device to a second wall;
   determining a second direction associated with the second wall;
   determining that the first distance is below a threshold value;
   determining that the second distance is below the threshold value; and
   determining that the device is located in a corner of the room corresponding to an intersection between the wall and the second wall, wherein the determining is based on the first distance, the first direction, the second distance and the second direction.

5. A computer-implemented method comprising:
   receiving, by a device located in an environment, first audio data associated with audible sound output by a loudspeaker;
   receiving, by the device, second audio data associated with a first microphone, the second audio data including a representation of the audible sound;
   determining first aggregate impulse response data associated with the first microphone, the first aggregate impulse response data representing combined acoustic characteristics of the environment and the device;
   determining, based on the second audio data, first impulse response data for the environment, wherein the first impulse response data is determined based on the first aggregate impulse response data using a sparse deconvolution algorithm;
   determining a first nonzero value in the first impulse response data, the first nonzero value corresponding to a first time;
   determining a second nonzero value in the first impulse response data, the second nonzero value corresponding to a second time; and
   determining, based on a first difference between the first time and the second time, a first distance from the device to a first reflective surface in the environment.

6. The computer-implemented method of claim 5, wherein determining the first distance further comprises:
   determining, based on a second difference between the first time and a third time at which the loudspeaker generated the audible sound, a first time delay associated with the first nonzero value;
   determining, based on a third difference between the second time and the first time, a second time delay associated with the second nonzero value;
   determining a second distance by multiplying the first time delay by a speed of sound;
   determining a third distance by multiplying the second time delay by the speed of sound; and
   determining the first distance based on the second distance and the third distance.

7. The computer-implemented method of claim 5, wherein determining the first impulse response data further comprises:
   determining system impulse response data associated with the device, the system impulse response data representing acoustic characteristics of the device;
   determining a vector of exponential decay constants; and
   determining, based on the first aggregate impulse response data and the system impulse response data, the first impulse response data using the sparse deconvolution algorithm, wherein a level of sparsity of the sparse deconvolution algorithm is controlled by the vector of exponential decay constants.

8. The computer-implemented method of claim 5, wherein determining the first impulse response data further comprises:
   determining, based on a second distance, a first exponential decay constant of a vector of exponential decay constants;
   determining, based on a third distance, a second exponential decay constant of the vector of exponential decay constants;
   determining, based on a fourth distance, a third exponential decay constant of the vector of exponential decay constants; and
   determining, based on the first aggregate impulse response data, the first impulse response data using the sparse deconvolution algorithm, wherein a level of sparsity of the sparse deconvolution algorithm is controlled by the vector of exponential decay constants.

9. The computer-implemented method of claim 5, further comprising:
receiving third audio data associated with a second microphone, wherein the first microphone and the second microphone are included in the device;
determining second aggregate impulse response data associated with the second microphone;
determining, based on the second aggregate impulse response data, second impulse response data associated with the second microphone;
determining, based on the first impulse response data and the second impulse response data, a plurality of beamformed data comprising:
first beamformed data corresponding to a first direction, and
second beamformed data corresponding to a second direction;
determining, based on the first beamformed data, third impulse response data;
determining, based on the third impulse response data, the first distance; and
determining that the first reflective surface is associated with the first direction.

10. The computer-implemented method of claim 5, further comprising:
receiving third audio data associated with a second microphone, wherein the first microphone and the second microphone are included in the device;
determining second aggregate impulse response data associated with the second microphone;
determining, based on the second aggregate impulse response data, second impulse response data associated with the second microphone;
determining, based on the first impulse response data and the second impulse response data, a plurality of beamformed data comprising:
first beamformed data corresponding to a first direction, and
second beamformed data corresponding to a second direction;
determining a first power value associated with the first beamformed data;
determining a second power value associated with the second beamformed data;
determining that the first power value is greater than the second power value; and
determining that the first reflective surface is associated with the first direction.

11. The computer-implemented method of claim 5, further comprising:
receiving third audio data associated with a second microphone, wherein the first microphone and the second microphone are included in the device;
determining second aggregate impulse response data associated with the second microphone;
determining, based on the second aggregate impulse response data, second impulse response data associated with the second microphone;
determining a third nonzero value in the second impulse response data, the third nonzero value corresponding to the second time; and
determining, based on the second nonzero value and the third nonzero value, a first direction associated with the first reflective surface based on time difference of arrival estimation.

12. The computer-implemented method of claim 5, further comprising:
determining a third nonzero value in the first impulse response data, the third nonzero value corresponding to a third time;
determining, based on the third time, a second distance from the device to a second reflective surface in the environment;
determining a first direction associated with the first reflective surface;
determining a second direction associated with the second reflective surface;
determining that the first distance is below a threshold value;
determining that the second distance is below the threshold value; and
determining, based on the first direction and the second direction, that the device is located in a corner.

13. A device comprising:
at least one processor; and
memory including instructions operable to be executed by the at least one processor to perform a set of actions to configure the device to:
receive, by the device located in an environment, first audio data associated with audible sound output by a loudspeaker;
receive, by the device, second audio data associated with a first microphone, the second audio data including a representation of the audible sound;
determine first aggregate impulse response data associated with the first microphone, the first aggregate impulse response data representing combined acoustic characteristics of the environment and the device;
determine, based on the second audio data, first impulse response data for the environment, wherein the first impulse response data is determined based on the first aggregate impulse response data using a sparse deconvolution algorithm;
determine a first nonzero value in the first impulse response data, the first nonzero value corresponding to a first time;
determine a second nonzero value in the first impulse response data, the second nonzero value corresponding to a second time; and
determine, based on a first difference between the first time and the second time, a first distance from the device to a first reflective surface in the environment.

14. The device of claim 13, wherein the device is further configured to:
determine, based on a second difference between the first time and a third time at which the loudspeaker generated the audible sound, a first time delay associated with the first nonzero value;
determine, based on a third difference between the second time and the first time, a second time delay associated with the second nonzero value;
determine a second distance by multiplying the first time delay by a speed of sound;
determine a third distance by multiplying the second time delay by the speed of sound; and
determine the first distance based on the second distance and the third distance.

15. The device of claim 13, wherein the device is further configured to:
determine system impulse response data associated with the device, the system impulse response data representing acoustic characteristics of the device;

determine a vector of exponential decay constants; and determine, based on the first aggregate impulse response data and the system impulse response data, the first impulse response data using the sparse deconvolution algorithm, wherein a level of sparsity of the sparse deconvolution algorithm is controlled by the vector of exponential decay constants.

16. The device of claim 13, wherein the device is further configured to:

determine, based on a second distance, a first exponential decay constant of a vector of exponential decay constants;

determine, based on a third distance, a second exponential decay constant of the vector of exponential decay constants;

determine, based on a fourth distance, a third exponential decay constant of the vector of exponential decay constants; and determine, based on the first aggregate impulse response data, the first impulse response data using the sparse deconvolution algorithm, wherein a level of sparsity of the sparse deconvolution algorithm is controlled by the vector of exponential decay constants.

17. The device of claim 13, wherein the device is further configured to:

receive third audio data associated with a second microphone, wherein the first microphone and the second microphone are included in the device;

determine second aggregate impulse response data associated with the second microphone;

determine, based on the second aggregate impulse response data, second impulse response data associated with the second microphone;

determine, based on the first impulse response data and the second impulse response data, a plurality of beamformed data comprising:
first beamformed data corresponding to a first direction, and
second beamformed data corresponding to a second direction;

determine, based on the first beamformed data, third impulse response data;

determine, based on the third impulse response data, the first distance; and determine that the first reflective surface is associated with the first direction.

18. The device of claim 13, wherein the device is further configured to:

receive third audio data associated with a second microphone, wherein the first microphone and the second microphone are included in the device;

determine second aggregate impulse response data associated with the second microphone;

determine, based on the second aggregate impulse response data, second impulse response data associated with the second microphone;

determine, based on the first impulse response data and the second impulse response data, a plurality of beamformed data comprising:
first beamformed data corresponding to a first direction, and
second beamformed data corresponding to a second direction;

determine a first power value associated with the first beamformed data;

determine a second power value associated with the second beamformed data;

determine that the first power value is greater than the second power value; and determine that the first reflective surface is associated with the first direction.

19. The device of claim 13, wherein the device is further configured to:

receive third audio data associated with a second microphone, wherein the first microphone and the second microphone are included in the device;

determine second aggregate impulse response data associated with the second microphone;

determine, based on the second aggregate impulse response data, second impulse response data associated with the second microphone;

determine a third nonzero value in the second impulse response data, the third nonzero value corresponding to the second time; and determine, based on the second nonzero value and the third nonzero value, a first direction associated with the first reflective surface based on time difference of arrival estimation.

20. The device of claim 13, wherein the device is further configured to:

determine a third nonzero value in the first impulse response data, the third nonzero value corresponding to a third time;

determine, based on the third time, a second distance from the device to a second reflective surface;

determine a first direction associated with the first reflective surface;

determine a second direction associated with the second reflective surface;

determine that the first distance is below a threshold value;

determine that the second distance is below the threshold value; and determine that the device is located in a corner.

* * * * *